United States Patent
Chandrasekhar et al.

(10) Patent No.: US 11,481,722 B2
(45) Date of Patent: *Oct. 25, 2022

(54) AUTOMATED EXTRACTION, INFERENCE AND NORMALIZATION OF STRUCTURED ATTRIBUTES FOR PRODUCT DATA

(71) Applicant: Hearst Magazine Media, Inc., New York, NY (US)

(72) Inventors: Govind Chandrasekhar, Bengaluru (IN); Ramanan Balakrishnan, Bengaluru (IN); Praveen Sekar, Bengaluru (IN); Yashaswini D R, Bengaluru (IN); Shiva Sankar Selva Kumar Valsala Kumari, Bengaluru (IN); Vijay Mohanbhai Bambhaniya, Bengaluru (IN); Srinivasan Kidambi Sridharan, Bengaluru (IN); Vinoth Gopinathan, San Francisco, CA (US); Varun Sivamani, San Francisco, CA (US); Raj Bhandari, Mountain View, CA (US); Asmit Kumar, Bengaluru (IN); Dinesh Kumar Nalluri, Bengaluru (IN)

(73) Assignee: Hearst Magazine Media, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,756

(22) Filed: Apr. 26, 2022

(65) Prior Publication Data

US 2022/0284392 A1    Sep. 8, 2022

Related U.S. Application Data

(63) Continuation-in-part of application No. 16/740,209, filed on Jan. 10, 2020, now Pat. No. 11,341,170, (Continued)

(51) Int. Cl.
 *G06Q 30/00* (2012.01)
 *G06Q 10/08* (2012.01)
 (Continued)

(52) U.S. Cl.
 CPC .......... *G06Q 10/0838* (2013.01); *G06F 7/14* (2013.01); *G06F 16/254* (2019.01);
 (Continued)

(58) Field of Classification Search
 CPC ............ G06Q 10/0838; G06Q 10/0831; G06F 16/258; G06F 16/254; G06F 7/14
 (Continued)

(56) References Cited

U.S. PATENT DOCUMENTS

| | | | | |
|---|---|---|---|---|
| 6,523,019 B1 * | 2/2003 | Borthwick | ............. | G06N 20/00 706/45 |
| 7,558,778 B2 * | 7/2009 | Carus | ..................... | G06N 20/00 707/999.003 |

(Continued)

OTHER PUBLICATIONS

Zonos Classify "Automate HS Code Classification", 14 pages, May 13, 2020.

*Primary Examiner* — Pavan Mamillapalli
(74) *Attorney, Agent, or Firm* — Knobbe, Martens, Olson & Bear LLP

(57) ABSTRACT

Methods, systems, and apparatus, including computer programs encoded on computer storage media, for automated extraction, inference and normalization of structured attributes for a Product Category Normalizer to access product records from external data sources. The Product Category Normalizer defines a product-description taxonomy of product categories represented by a classification tree. The Product Category Normalizer employs product attribute data and machine learning techniques to analyze the product data of an input product record. Based on the product data of the input product record, the Product Category Normalizer (Continued)

extracts and infers appropriate product data for a relevant product category in the classification tree for the item described by the input product record. The Product Category Normalizer normalizes the product data of the input product record. The Product Category Normalizer provides an output normalized product record related to a product category and product attributes of the classification tree.

26 Claims, 15 Drawing Sheets

Related U.S. Application Data which is a continuation-in-part of application No. 16/740,301, filed on Jan. 10, 2020.

(51) Int. Cl.
  *G06F 16/25* (2019.01)
  *G06N 20/00* (2019.01)
  *G06F 7/14* (2006.01)

(52) U.S. Cl.
  CPC .......... *G06F 16/258* (2019.01); *G06N 20/00* (2019.01); *G06Q 10/0831* (2013.01)

(58) Field of Classification Search
  USPC ........................................ 705/341
  See application file for complete search history.

(56) References Cited

U.S. PATENT DOCUMENTS

| | | | |
|---|---|---|---|
| 7,689,527 B2* | 3/2010 | Pavlov | G06F 16/90344 706/45 |
| 8,122,026 B1* | 2/2012 | Laroco, Jr | G06F 16/93 707/730 |
| 9,049,117 B1 | 6/2015 | Nucci | |
| 9,870,629 B2 | 1/2018 | Cardno | |
| 2003/0088458 A1* | 5/2003 | Afeyan | G06F 30/00 706/13 |
| 2003/0217052 A1* | 11/2003 | Rubenczyk | G06F 16/951 707/E17.058 |
| 2004/0225624 A1* | 11/2004 | Reynolds | G06Q 20/204 705/401 |
| 2007/0282900 A1* | 12/2007 | Owens | G06F 16/2465 |
| 2008/0243905 A1* | 10/2008 | Pavlov | G06F 16/90344 707/999.102 |
| 2009/0012842 A1 | 1/2009 | Srinivasan | |
| 2009/0119268 A1 | 5/2009 | Bandaru | |
| 2010/0138712 A1* | 6/2010 | Lee | G06F 11/0763 714/E11.023 |
| 2011/0320414 A1 | 12/2011 | Sim | |
| 2012/0203708 A1* | 8/2012 | Psota | G06Q 30/06 705/347 |
| 2012/0272160 A1 | 10/2012 | Spivack | |
| 2013/0110594 A1 | 5/2013 | Sinyagin | |
| 2014/0114758 A1 | 4/2014 | Bentley | |
| 2014/0149105 A1 | 5/2014 | Lamba | |
| 2014/0358828 A1* | 12/2014 | Phillipps | G06N 20/00 706/12 |
| 2015/0170055 A1* | 6/2015 | Beymer | G06N 20/00 706/12 |
| 2015/0332369 A1 | 11/2015 | Nakane | |
| 2016/0224938 A1* | 8/2016 | Shah | G06Q 10/083 |
| 2016/0357408 A1 | 12/2016 | Zavar | |
| 2017/0046763 A1 | 2/2017 | Pan | |
| 2017/0302627 A1 | 10/2017 | Lai | |
| 2018/0013720 A1 | 1/2018 | Sachdev | |
| 2018/0137560 A1 | 5/2018 | Chopra | |
| 2019/0043095 A1 | 2/2019 | Grimaud | |
| 2019/0095973 A1 | 3/2019 | Byron | |
| 2019/0197063 A1* | 6/2019 | Sekar | G06N 3/006 |
| 2019/0220694 A1 | 7/2019 | Biswas | |
| 2020/0151201 A1* | 5/2020 | Chandrasekhar | G06N 5/022 |
| 2020/0151663 A1 | 5/2020 | Balakrishnan et al. | |

\* cited by examiner

220-1

Utilize the classification tree, the plurality of attribute lists and the plurality of extraction heuristics to output a normalized record categorizing at least one product record's input data according to the classification tree's product-description taxonomy Predict product category for input product record via machine learning models for a pre-processed record ⟶ 222

Generate at least one extracted attribute via machine learning models for an extracted record combined with the a pre-processed record ⟶ 224

Generate at least one inferred attribute, via machine learning models, inserted into the extracted record to generate a merged product record ⟶ 226

Output normalized product record comprising (a) at least one numeric data value of the merged product record standardized according to the attribute-master list and (b) at least one textual data value of the merged product record standardized according to at least one of the attribute-allowed-values list and the attribute-equivalent-values list. ⟶ 228

FIG. 2C

AUTOMATED EXTRACTION, INFERENCE AND NORMALIZATION OF STRUCTURED ATTRIBUTES FOR PRODUCT DATA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

Many websites host a large variety of products that can be purchased. Some of the products have multiple attributes that may apply to a single product, such as size and color. It would be desirable to be able to collect information about products and their attributes on the web in an automated fashion to develop an advantageous dataset containing information about the many products in the world.

Description of the Related Art

SUMMARY OF THE INVENTION

Described herein are methods, systems, and apparatus, including computer programs encoded on computer storage media, for artificial intelligence for automated extraction, inference and normalization of structured attributes for product data.

In general, one innovative aspect of disclosed embodiments includes a computer system, computer-implemented method, and non-transitory computer-readable medium having instructions for generating a normalized product record using a machine learning model. The computer system defines a product-description taxonomy represented according to a classification tree by clustering tags based on product data from product records in a product catalog. The classification tree includes at least one product category path defined by product category nodes (nodes) at successively deeper tree levels, where each product category node is associated with at least one product attribute-key paired with one or more key-values. The computer system defines key data based on the product data. The key data includes at least one product attribute-key (master attribute-key), a plurality of allowed key-values, and a representative key-value matched to a list of equivalent key-values. The computer system defines heuristic data based on the product data and the key data. The heuristic data includes a mapping between a master attribute-key and a list of equivalent attribute-keys, at least one key-value exclusive to a particular master attribute-key and a frequent text phrase as a regex key-value that corresponds to a master attribute-key. The computer system applies to one or more machine learning (ML) models, the key data and the heuristic data to an input product record to generate an output normalized product record categorizing the input product record according to the classification tree's product-description taxonomy, where the product data of the plurality of input product records is based on multiple, incongruent third-party product-description taxonomies.

In general, another innovative aspect of disclosed embodiments includes a computer system, computer-implemented method, and non-transitory computer-readable medium having instructions for generating a normalized product record. A computer system receives a product catalog including a collection of product records from one or more external data sources. Each product record includes input product data defined according to a native product-description taxonomy for a respective external data source. The computer system initiates a preliminary mode that includes building a classification tree by clustering tags based on the input product data of the product records. The classification tree represents a product-description taxonomy with at least one product category path defined by product category nodes at successively deeper tree levels, and each product category node associated with at least one product attribute-key paired with one or more key-values.

The computer system builds, based on the input product data, a plurality of attribute-key-value lists including: (i) an attribute-master list, the attribute-master list defining a plurality of master product attribute keys (master-attribute-keys) for each product category node in the classification tree; (ii) an attribute-allowed-values list including a plurality of key-values for each master-attribute key; and (iii) an attribute-equivalent-values list including a representative key-value matched to a list of equivalent key-values, the representative-key value selected as a replacement for any of the matched equivalent key-values.

The computer system based on the input product data, the classification tree, and the plurality of the attribute lists, generates a one or more extraction heuristics. The extraction heuristics may include (i) an attribute-key-mapping heuristic comprising a respective master attribute-key matched to a list of equivalent attribute-keys; (ii) a key-value-dictionary heuristic defining exclusive key-values for particular master attribute-keys; and (iii) at least one pattern heuristic that identifies a frequent text phrase as a regex key-value that corresponds to a master attribute-key.

The computer system initiates an extraction and inference mode that utilizes the classification tree, the plurality of attribute lists and the plurality of extraction heuristics to output a normalized record categorizing at least one product record's input data according to the classification tree's product-description taxonomy, the extraction and inference mode and generates: (i) a predicted product category by feeding the respective product record into one or more machine learning (ML) models that tracks the classification tree; (ii) at least one extracted attribute by feeding the respective product record and the predicted product category into the one or more machine learning (ML) models; (iii) an extracted product record based on the extracted attribute, the respective product record and the predicted product category; (iv) at least one inferred attribute by feeding the extracted product record into the one or more machine learning (ML) models; (v) a merged product record based on adding the inferred attribute to the extracted product record; and (vi) the output normalized product record including (a) at least one numeric data value of the merged product record standardized according to the attribute-master list and (b) at least one textual data value of the merged product record standardized according to at least one of the attribute-allowed-values list and the attribute-equivalent-values list.

Optionally, one or more ML models are utilized to predict a product code data for a product. A product code may be based on one or more classification code taxonomies (e.g., commerce classification code taxonomies developed by governments and international agencies per regulatory requirements, such as Harmonized System (HS) code, Harmonized Tariff System (HTS) code, Export Control Classification Number (ECCN) code, Schedule B code, or United Nations Standard Products and Services Code (UNSPSC)). If more than one ML model is used, the ensemble of ML models for predicting the product code may include multiple machine learning techniques, such as: logistic regression, random forests, gradient boosting, as well as modern deep learning techniques, such as convolutional neural networks (CNNs), bi-directional long-short term memory (LSTM) networks and transformer networks. The predicted product code data may be added to the product data record.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIGS. 2A-2C illustrate example methods of one or more embodiments.

DETAILED DESCRIPTION OF THE PREFERRED EMBODIMENT

Figure 1A:
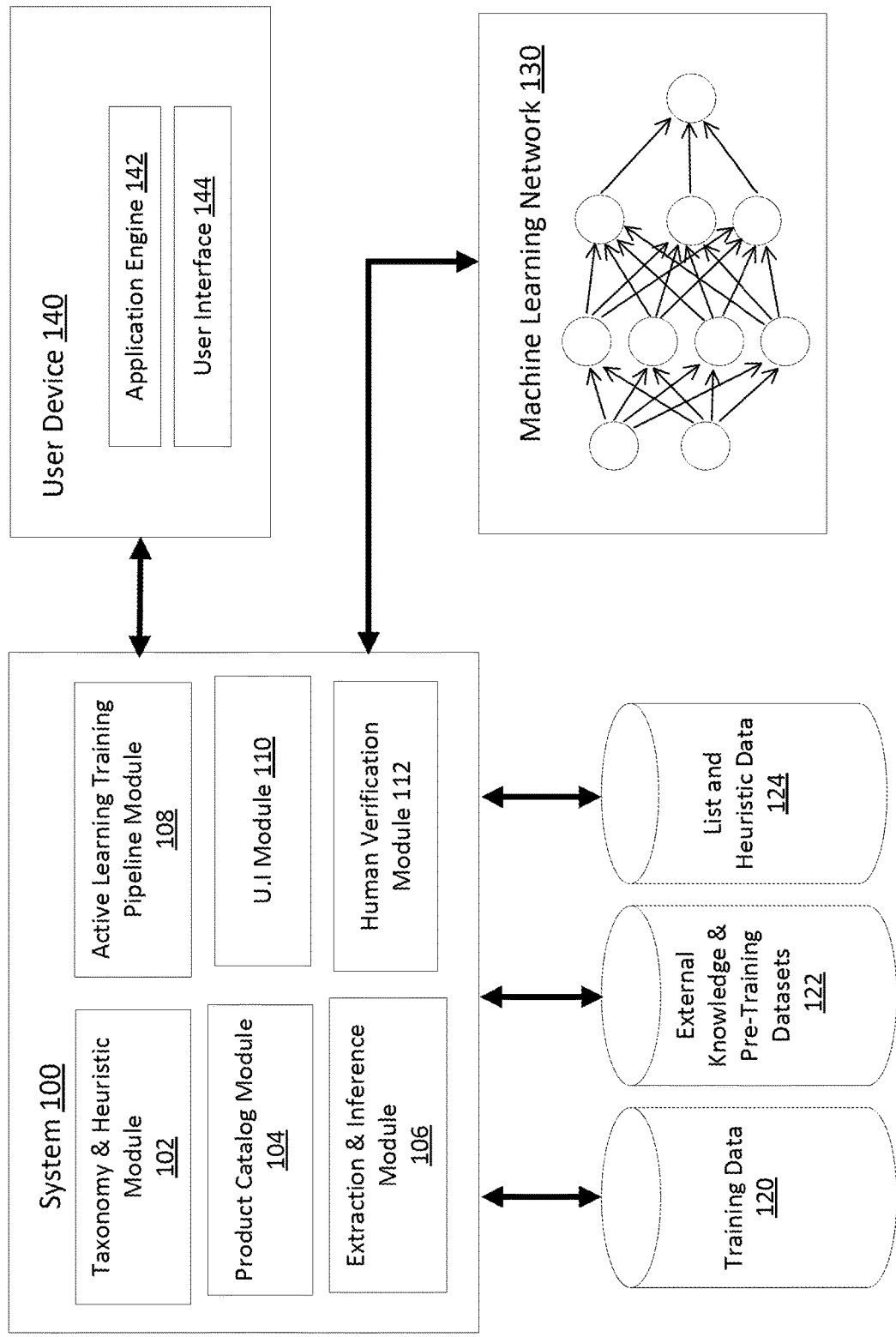
FIG. 1A illustrates an example environment in which one or more embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

In conventional systems, product data may be from different, multiple data sources, such as various online retailers, marketplaces and E-commerce platforms. Each data source may offer purchase of similar items but use different product category taxonomies. As a result, product data about the same item from different data sources may be structured in different ways according to different labels, abbreviations, variations in wordings and equivalent terminology.

Disclosed embodiments relate to a method and system for a Product Category Normalizer to access product records from external data sources. The Product Category Normalizer defines a product-description taxonomy of product categories represented by a classification tree. The Product Category Normalizer employs product attribute data and machine learning techniques to analyze the product data of an input product record. Based on the product data of the input product record, the Product Category Normalizer extracts and infers appropriate product data for a relevant product category in the classification tree for the item described by the input product record. The Product Category Normalizer normalizes the product data of the input product record. The Product Category Normalizer provides an output normalized product record related to a product category and product attributes of the classification tree. The output normalized product record may thereby be utilized for a clean product listing, advanced product search platforms, and product recommendation algorithms.

Each node (or leaf) in the classification tree of the Product Category Normalizer represents a product category. Each product category may have one or more product attribute-keys ("attribute-key"). Each attribute-key may have one or more key-values. Example attribute-keys may be "Brand" and "Color" for a "Clothing" product category. Example key-values for the "Brand" attribute-key may be "Levi's, Wrangler, Calvin Klein." Example key-values for the "Color" attribute-key may be "Blue, Black, Red."

The Product Category Normalizer defines various product attribute-key lists and various key-value lists. The product attribute-key lists and various key-value lists define attribute-keys for nodes, key-values and various attribute-key and key-value mappings. In one embodiment, humans may act as testers of the system in order to verify or override the product attribute-key lists and various key-value lists.

The Product Category Normalizer defines various extraction heuristics that, when applied to an input product record, provide mappings and suggestions as between product data present in an input product record being categorized and possible attribute-keys and key-values that should be used to represent the input product record according to the classification tree's product-description taxonomy. In one embodiment, humans may also act as testers of the system in order to verify or override the various extraction heuristics.

The Product Category Normalizer may employ various machine learning techniques to further infer attribute-keys and key-values for a product category in the classification tree that may be used to describe an item of an input product record. Example machine learning techniques may be based on classification named entity recognition, imputation and regression models.

As shown in FIG. 1A, an example system 100 of the Product Category Normalizer may include a taxonomy & heuristic module 102, a product catalog module 104, an extraction & inference module 106, an active learning pipeline module 108, a user interface (U.I.) module 110 and a human verification module 112. The system 100 may communicate with a user device 140 to display output, via a user interface 144 generated by an application engine 142. A machine learning network 130 and one or more databases 120, 122, 124 may further be components of the system 100 as well.

Figure 1B:
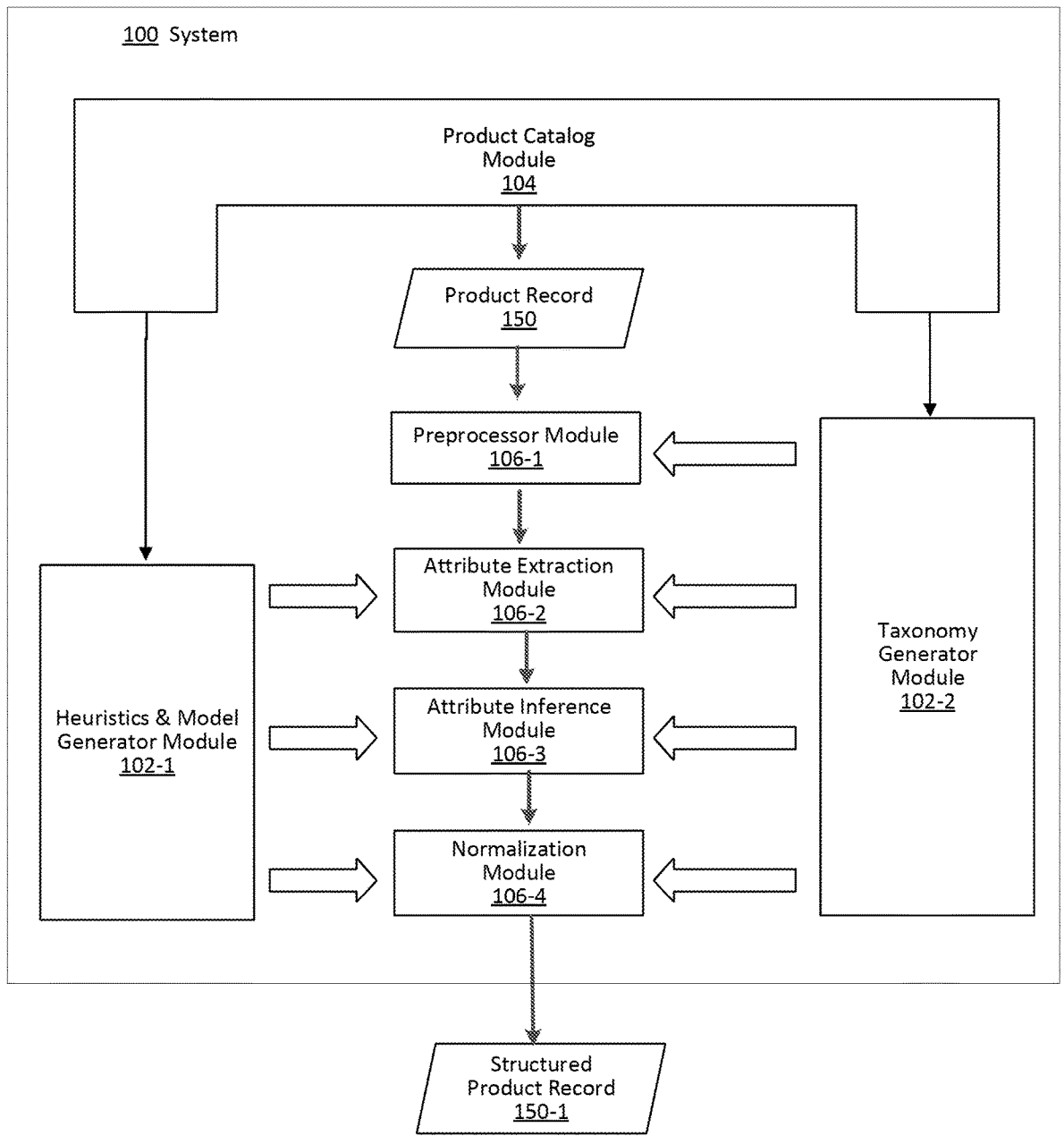
FIG. 1B illustrates diagrams of example modules of one or more embodiments.

The taxonomy & heuristic module 102 of the system 100 may perform functionality as illustrated in FIGS. 1B, 2A-2B, 3A-3E and 4A. The taxonomy & heuristic module 102 includes a heuristics & model generator 102-1 and a taxonomy generator module 102-2 as shown in FIG. 1B.

The product catalog module 104 of the system 100 may perform functionality as illustrated in FIGS. 1B, 2A-2B, 3A, 3D and 4A.

The extraction & inference module 106 of the system 100 may perform functionality as illustrated in FIGS. 1B, 2A-2C, 4B and 5. The extraction & inference module 106 may include a preprocessor module 106-1, attribute extraction module 106-2, attribute inference module 106-3 and a normalization module 106-4 as shown in FIG. 1B.

Figure 3A:
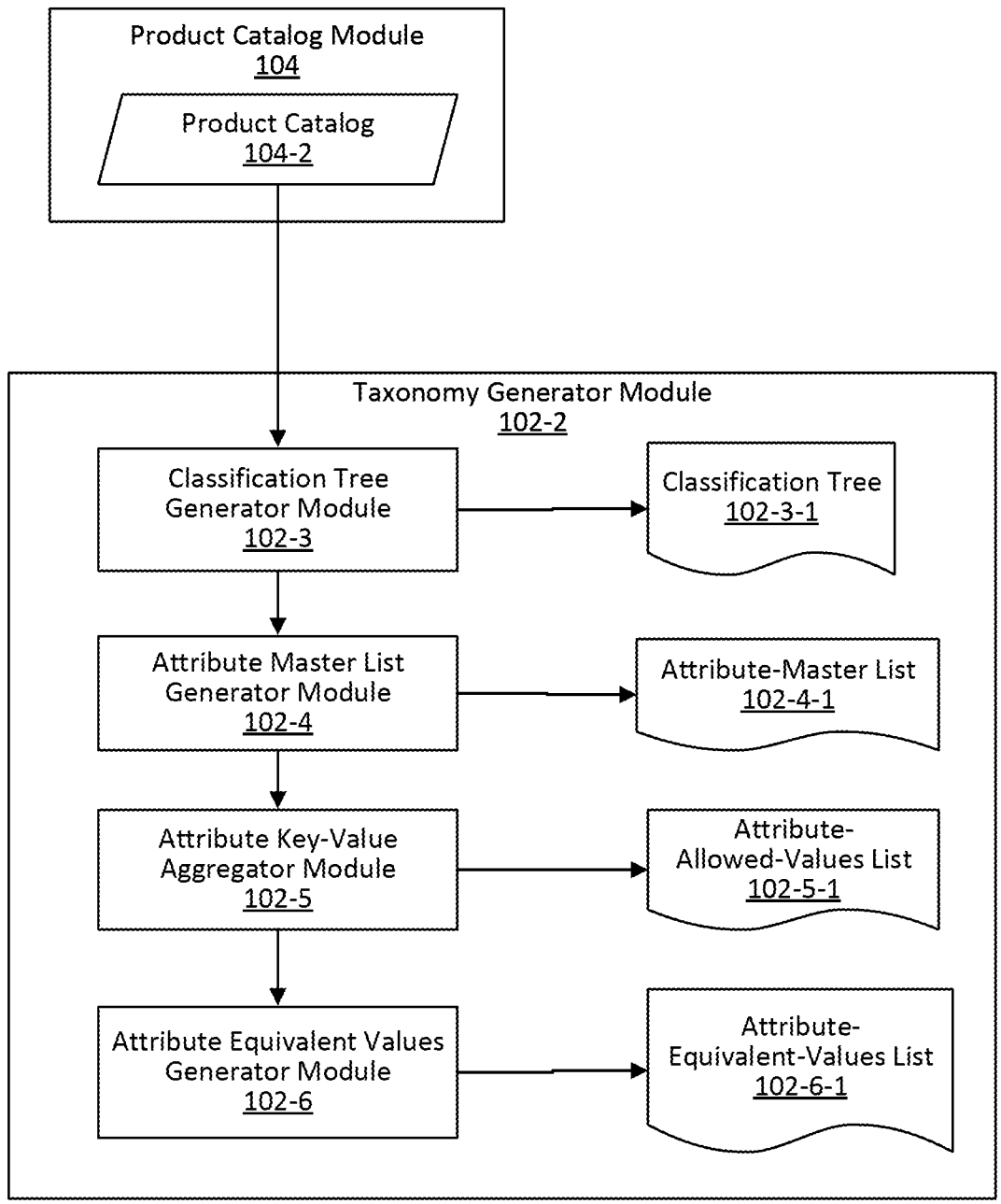
FIG. 3A is an example diagram of one or more embodiments.
Figure 3B:
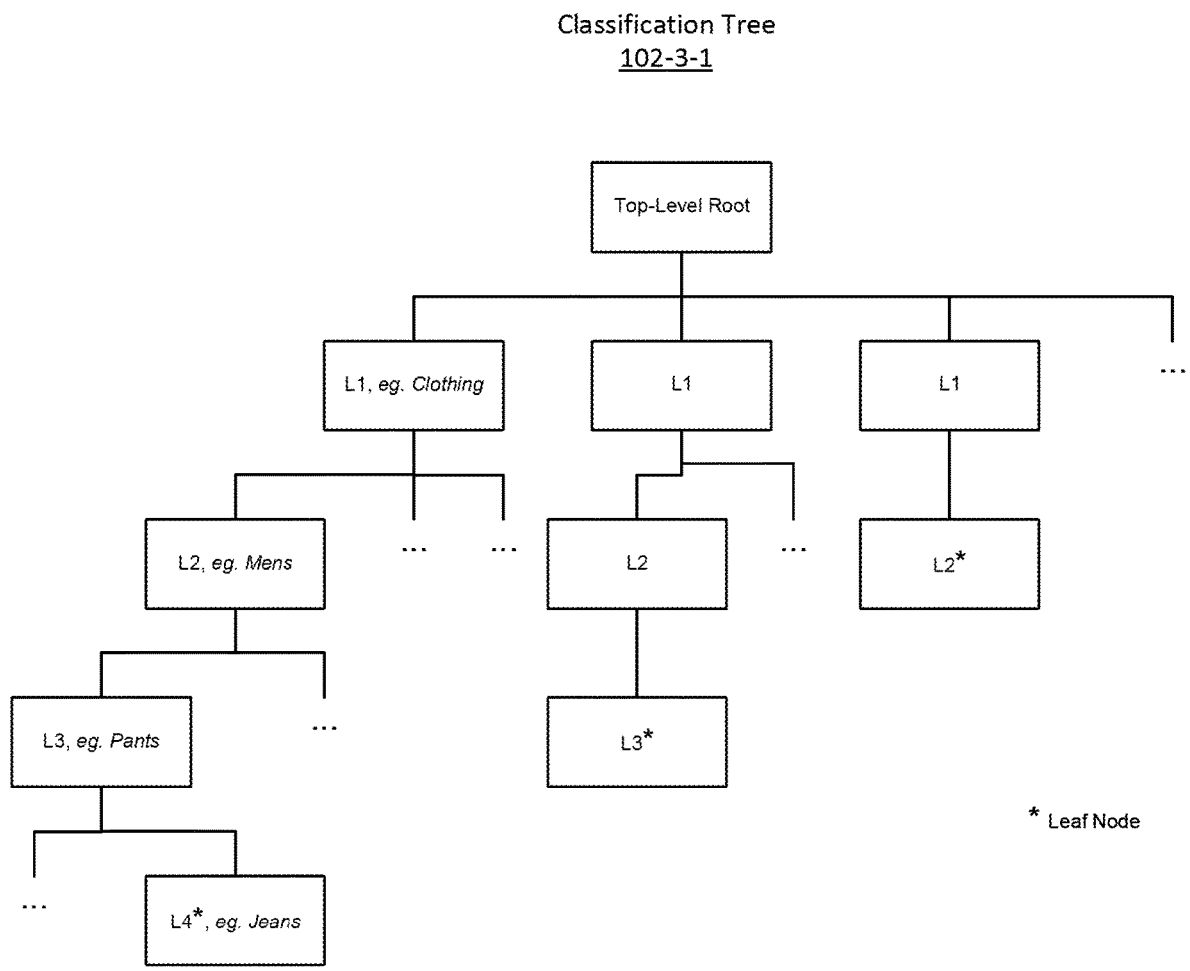
FIG. 3B is an example diagram of a classification tree of one or more embodiments.
Figure 3C:
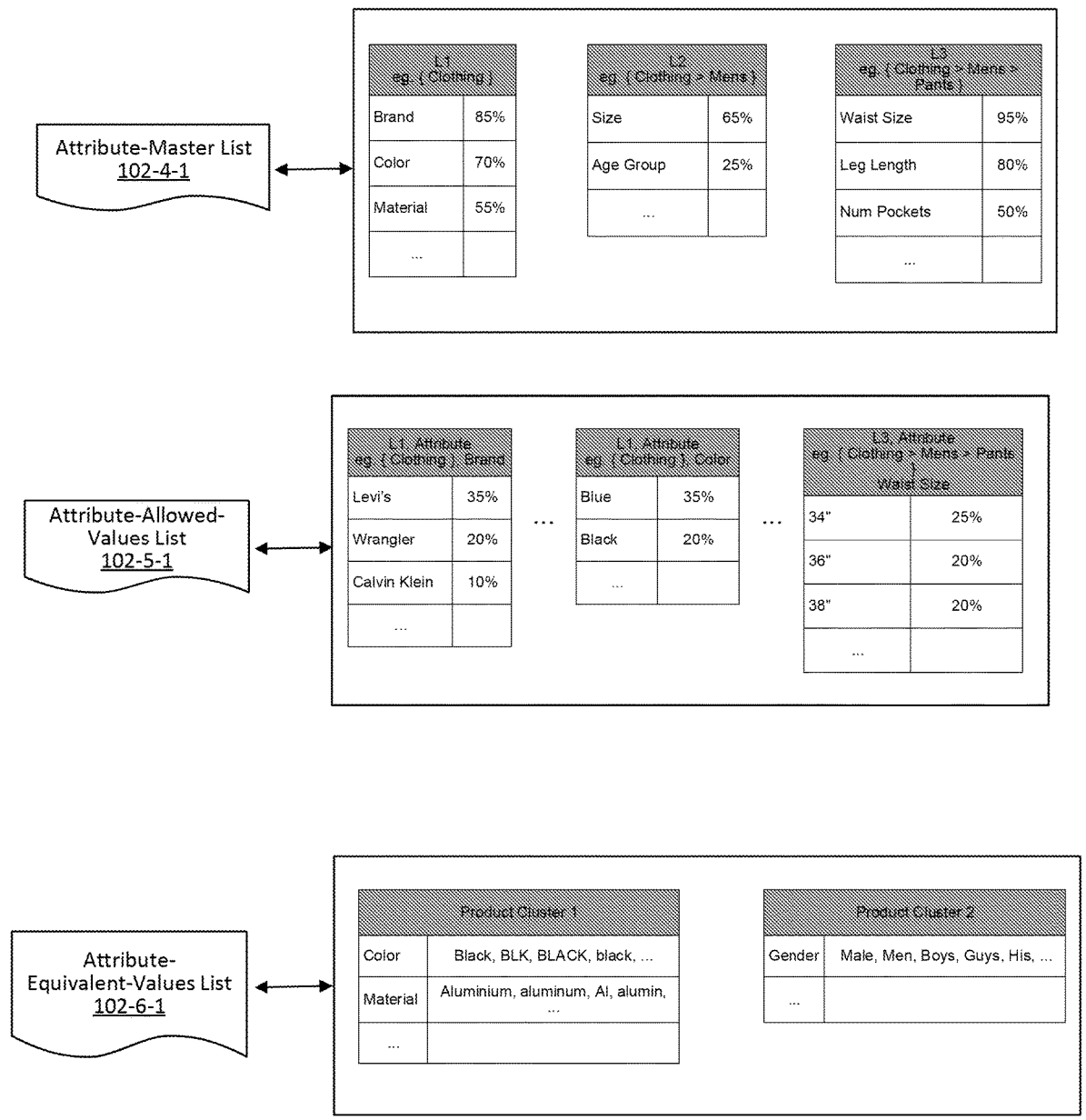
FIG. 3C is an example diagram of lists of one or more embodiments.
Figure 3D:
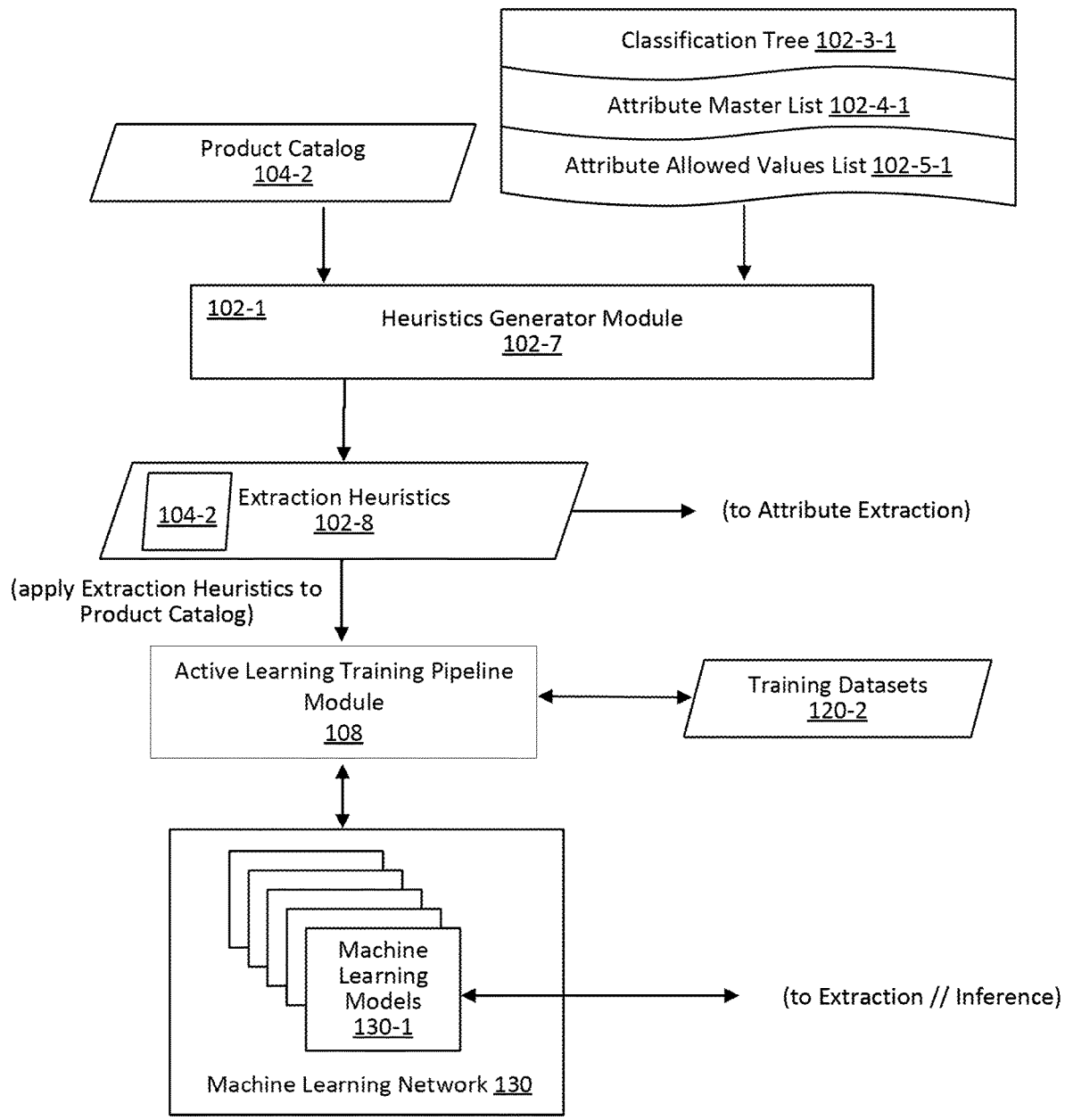
FIG. 3D is an example diagram of one or more embodiments.

The active learning pipeline module 108 of the system 100 may perform functionality as illustrated in FIG. 3D. It is understood that the functionality of the active learning pipeline module 108 may also be based on any functionality of the other module 102, 104, 106, 112 of the system 100.

The user interface (U.I.) module 110 of the system 100 may perform any functionality with respect to causing display of any output, input, data and information of the system 100 via the user interface 144.

Figure 5:
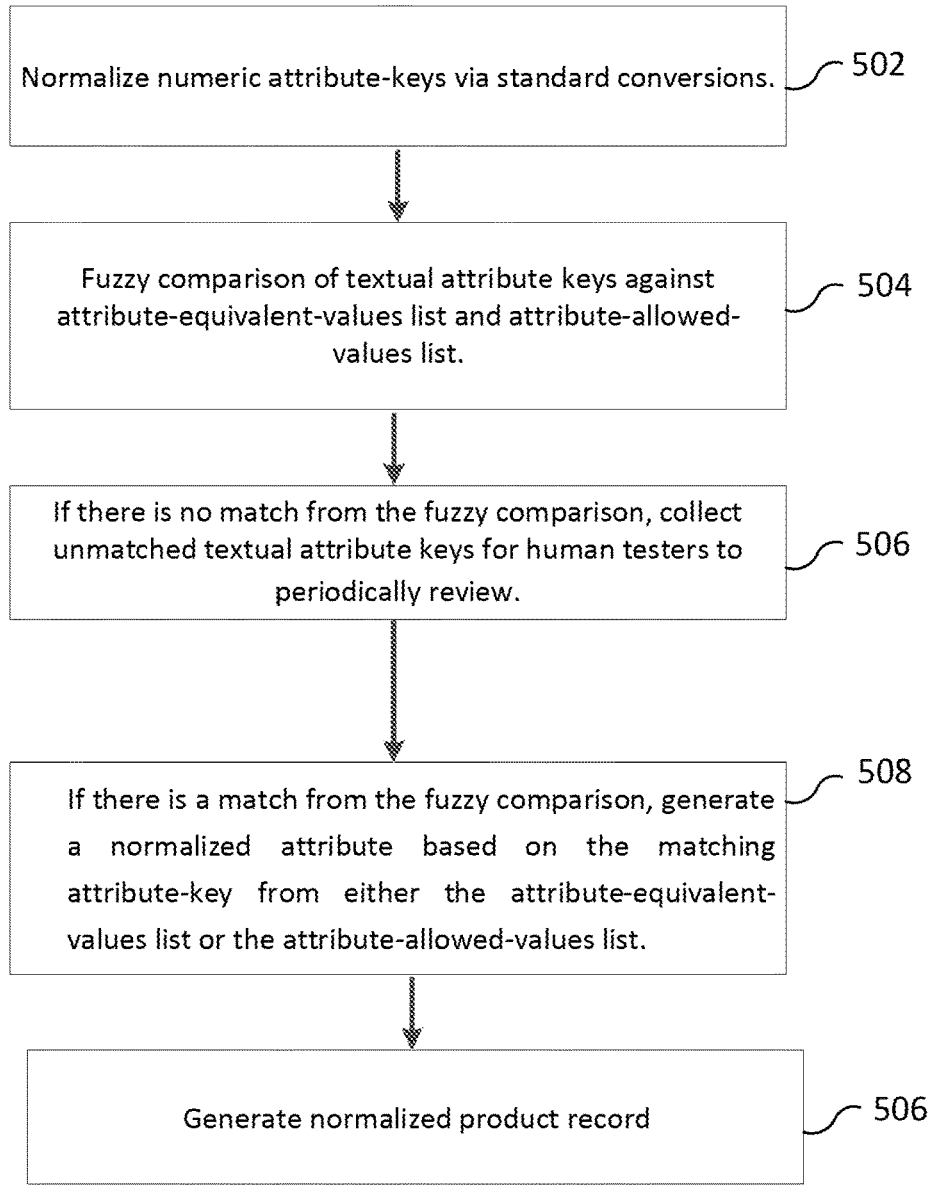
FIG. 5 is an example method of one or more embodiments.

The human verification module 112 of the system 100 may perform functionality as illustrated in FIGS. 1B and 5.

While the databases 120, 122 and 124 are displayed separately, the databases and information maintained in a database may be combined together or further separated in a manner the promotes retrieval and storage efficiency and/or data security.

As shown in FIG. 1B, a heuristics & model generator module 102-1 and a taxonomy generator module 102-2 receive input product records of a product catalog from the product catalog module 104. The heuristics & model generator module 102-1 and the taxonomy generator module 102-2 are utilized for a preliminary mode of the system 100. The taxonomy generator module 102-2 completes a number of operations to generate the overall metadata that is required when obtaining structured product categories, attribute-keys and key-values given a product record. By taking the product catalog as input, the taxonomy generator module 102-2 produces a number of lists as output, such as (a) classification tree, (b) attribute-master list, (c) attribute-allowed-values list and (d) attribute-equivalent-values lists. These lists of information serve as auxiliary data employed during an extraction and inference mode of the system 100 against an individual input product record(s) 150. As the lists are generated and updated, human testers may sample data from the list and send verifications of the lists or overrides of the lists to the human verification module 112.

The heuristics & model generator module 102-1 also operates at the level of the product catalog. The heuristics & model generator module 102-1 generates a set of extraction heuristics to capture the most popular text patterns inherent in the dataset of the product catalog. The heuristics & model generator module 102-1 combines the product catalog together with the lists of the taxonomy generator module 102-2 as input. Within each product record of the product catalog, the heuristics & model generator module 102-1 parses the product data to generate extraction heuristics, such as attribute-key-mapping, key-value dictionaries and regex key-values. As the extraction heuristics are generated and updated, human testers may sample data from the list and send verifications of the extraction heuristics or overrides of the extraction heuristics to the human verification module 112.

The system 100 may also employ the extraction heuristics building of training datasets in the training data 120 for machine learning models of the machine learning network 130. As the system 100 generates output dataset from applying the extraction heuristics to various input product catalogs to generate output datasets. The output datasets invariably represent product records enriched with product attribute information and may thereby be used as training datasets for training one or more machine learning models.

For the extraction and inference mode of the system 100, an input product record 150 is first sent to the preprocessor module 106-1 which prepares the input product record for efficient attribute enrichment. The role of the preprocessor module 106-1 is to complete a number of tasks, including classification, attribute placeholder creation as well as formatting. The preprocessor module 106-1 preprocesses the input product record 150 with the classification tree. Using one or more machine learning classification models trained via the active learning training pipeline module 108, an output product category is predicted by the preprocessor module 106-1 for each input product record 150. The output predicted product category is represented by a specific node within the classification tree.

The attribute extraction module 106-2 applies extraction techniques to the preprocessed product record, which includes the output predicted product category, generated by the preprocessor module 106-1. Such extraction techniques applied by the attribute extraction module 106-2 may include applying the extraction heuristics from the heuristics & model generator module 102-1 as well as one or more machine learning extraction models in the machine learning network 130 which were trained using the active learning training pipeline module 108.

The attribute extraction module 106-2 may apply certain extraction heuristics to the preprocessed record on account of the predicted product category. Additionally, any relevant learned metrics about the extraction heuristics (such as precision and recall) obtained during the generation stage of the heuristics & model generator module 102-1 can be used to assign confidence scores to the extracted attributes. Confidence scores may be a measure of the accuracy of the extracted attributes.

The attribute extraction module 106-2 may employ one or more machine learning extraction models of the machine learning (ML) network 130 to the preprocessed product record. For example, a named entity recognition (NER) model(s) may segment out product attributes from text in the preprocessed product record. The output of the attribute extraction module 106-2 may be one or more extracted attributes from application of both the extraction heuristics and the one or more machine learning extraction models. The extracted attributes are inserted into the preprocessed record to generate an extracted product record. The extracted product record is augmented with relevant metadata, such as an attribute-master list, an attribute-allowed-value list, and one or more attribute distribution histograms.

The attribute inference module 106-3 takes the extracted product record as input. The attribute inference module 106-3 employs various types of ML models of the ML network 130. The attribute inference module 106-3 may employ regression ML models to predict numeric attribute-keys. An example numeric product attribute may be a "kilogram" attribute-key with key-values that are represented by numeric data—as opposed to textual data. The regression ML models may utilize extracted attributes and an attribute-master list and an attribute-allowed-values list. Numeric attribute-keys tend to have key-values within fixed bounds which can be predicted by the regression output.

One or more classification models may also be employed by the attribute inference module 106-3 to infer attribute-keys. The classification models may utilize extracted attributes as well as the attribute-master list and the attributes-allowed-values list. Attribute-keys that have a fixed set of possible key-value can be predicted by the classification output. In addition, one or more imputation models may also be employed by the attribute inference module 106-3 to infer attribute-keys. Imputation models can be used to complete absent attribute-keys that are dependent on the presence of other proximate attribute-keys. The imputation models may utilize extracted attributes as well as attribute distribution histograms, and attribute key-value distribution histograms. The task of the imputation models is framed as that of filling in the other missing attribute-keys given a surrounding context created by the presence of existing attribute-keys. The inferred attribute-keys of generated by the attribute inference module 106-3 may be merged with the extracted product record to generate a merged product record. The merged product record is sent as input for the normalization module 106-4.

The normalization module 106-4 ensures a standardized representation of product attribute information. Extracted and inferred attribute-keys of a numeric data type may be standardized following standard conversion rules available between various numeric scales. For example, the weight attribute-key can be trivially converted by the normalization module 106-4 between various available scales (such as "kilogram", "pounds", "stones", or "ounces").

Extracted and inferred attribute-keys of a textual data type are compared against an attribute-allowed-values list by the normalization module 106-4 to identify any one-to-one mapping. Presence of a one-to-one mapping may indicate that human curated lists of key-values against one or more extracted and inferred attribute-keys are preferred. The extracted and inferred text attribute-keys may also be compared against an attribute-equivalent-values list to detect and correct any misspellings, spelling variations (such as spelling variations between UK vs US English) and character case. By matching against the attribute-allowed-values list and attribute-equivalent-values list, the normalization module 106-4 constrains the range of possible text key-values that are available against each extracted and inferred text attribute-keys.

Figure 2A:
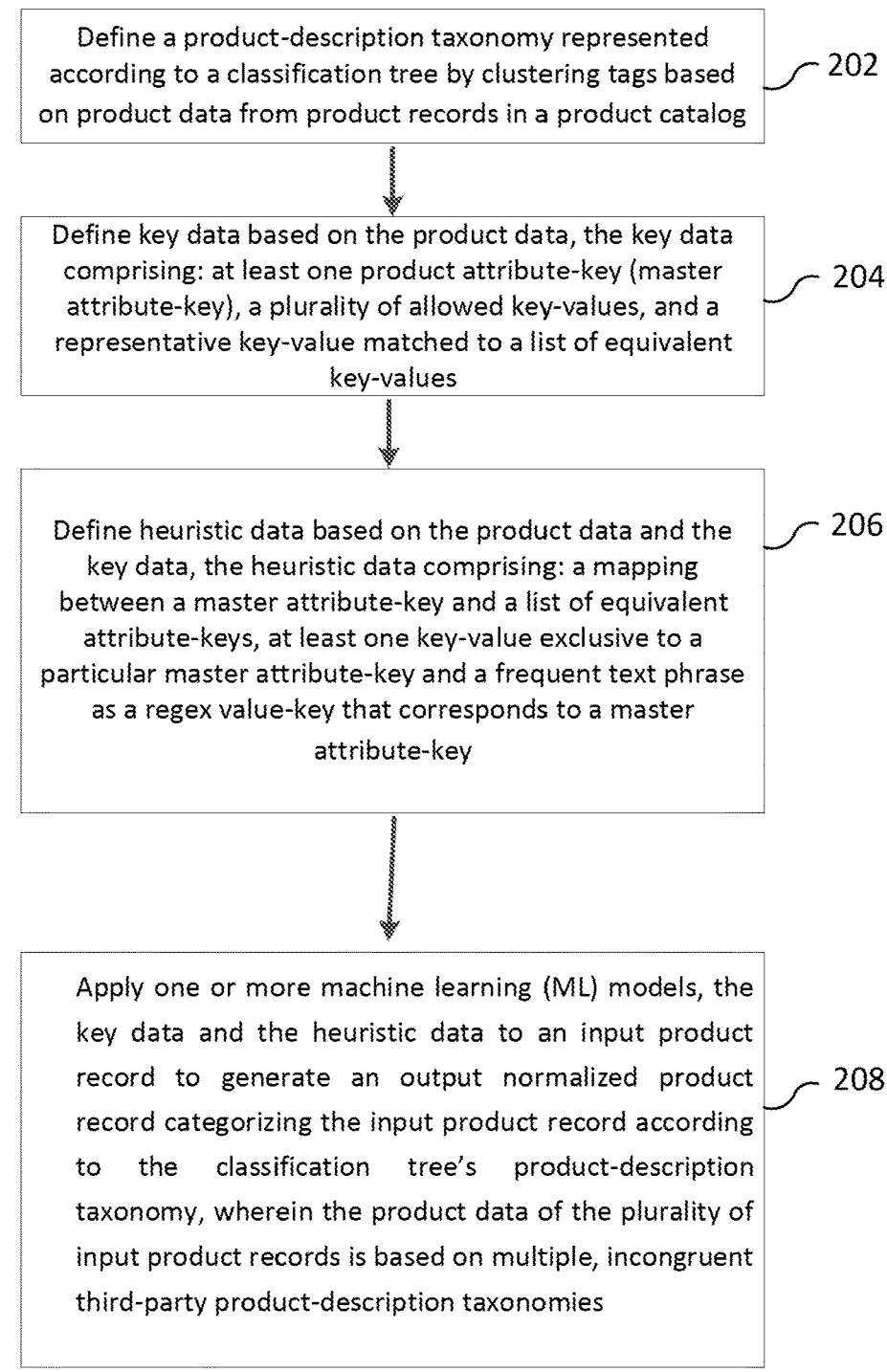

As shown in the example method 200 of FIG. 2A, the system 100 of Product Category Normalizer defines a product-description taxonomy represented according to a classification tree by clustering tags based on product data from product records in a product catalog (Act 202). The classification tree comprises at least one product category path defined by product category nodes (nodes) at successively deeper tree levels. Each product category node is associated with at least one product attribute-key paired with one or more key-values.

The system 100 defines key data based on the product data (Act 204). The key data comprises at least one product attribute-key (master attribute-key), a plurality of allowed key-values, and a representative key-value matched to a list of equivalent key-values. The system 100 defines heuristic data based on the product data and the key data (Act 206). The heuristic data comprises a mapping between a master attribute-key and a list of equivalent attribute-keys, at least one key-value exclusive to a particular master attribute-key and a frequent text phrase as a regex key-value that corresponds to a master attribute-key.

The system 100 applies one or more ML models, the key data and the heuristic data to an input product record to generate an output normalized product record categorizing the input product record according to the classification tree's product-description taxonomy (Act 208). It is understood that the product data of the plurality of input product records is based on multiple, incongruent third-party product-description taxonomies.

Figure 2B:
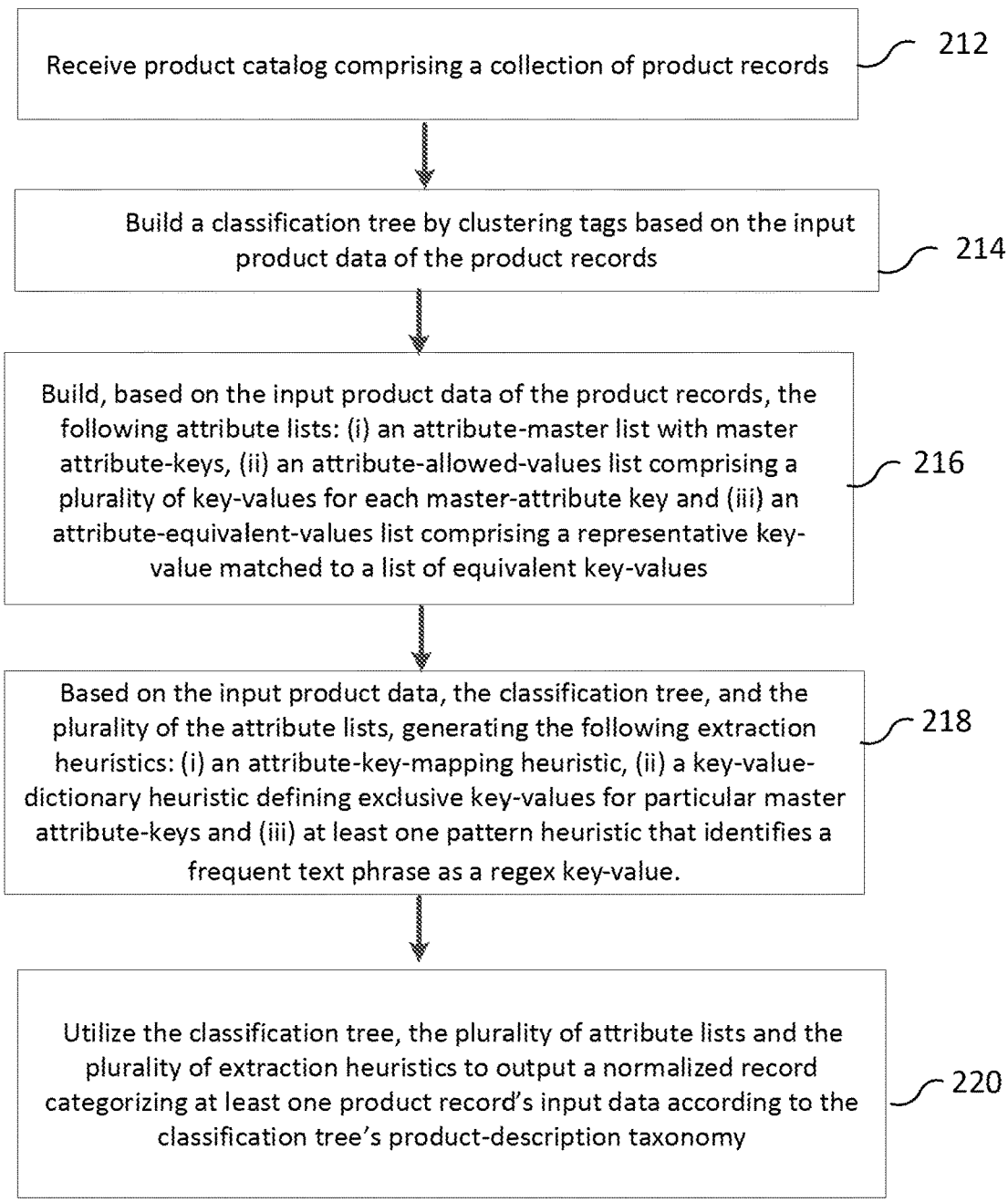

As shown in the example method 210 of FIG. 2B, the system 100 receives a product catalog comprising a collection of product records from one or more external data sources (Act 212). Each product record may include input product data defined according to a native product-description taxonomy for a respective external data source. The system 100 initiates a preliminary mode by building a classification tree by clustering tags based on the input product data of the product records (Act 214). The classification tree represents a product-description taxonomy with at least one product category path defined by product category nodes at successively deeper tree levels. Each product category node is associated with at least one product attribute-key paired with one or more key-values.

Based on the input product data, the system 100 builds a plurality of attribute-key-value lists (Act 216). An attribute-master list defines a plurality of master product attribute keys (master-attribute-keys) for each product category node in the classification tree. An attribute-allowed-values list comprises a plurality of key-values for each master-attribute key. An attribute-equivalent-values list comprises a representative key-value matched to a list of equivalent key-values. The representative-key value is selected to act as replacement for any of the matched equivalent key-values.

Based on the input product data, the classification tree, and the plurality of the attribute lists, the system 100 generates a plurality of extraction heuristics (Act 218). An attribute-key-mapping heuristic has a respective master attribute-key matched to a list of equivalent attribute-keys. A key-value-dictionary heuristic defines exclusive key-values for particular master attribute-keys. A pattern heuristic identifies a frequent text phrase as a regex key-value that corresponds to a master attribute-key.

The system 100 utilizes the classification tree, the plurality of attribute lists and the plurality of extraction heuristics to output a normalized record categorizing at least one product record's input data according to the classification tree's product-description taxonomy (Act 220).

As shown in the example method 220-1 of FIG. 2C, the system 100 generates a predicted product category by feeding the respective product record into one or more machine learning (ML) models that tracks the classification tree. The system 100 generates an extracted attribute by feeding the respective product record and the predicted product category into the one or more machine learning (ML) models (Act 222). The system 100 builds an extracted product record based on the extracted attribute, the respective product record and the predicted product category (Act 224). The system 100 generates an inferred attribute by feeding the extracted product record into one or more ML models (Act 226). A merged product record is based on adding the inferred attribute to the extracted product record. The system 100 generates an output normalized product record comprising (a) at least one numeric data value of the merged product record standardized according to the attribute-master list and (b) at least one textual data value of the merged product record standardized according to at least one of the attribute-allowed-values list and the attribute-equivalent-values list (Act 228).

As shown in FIG. 3A, a classification tree generator module 102-3 generates a classification tree 102-3-1 based on a product catalog 104-2 that includes one or more product records. For example, the classification tree generator module 102-3 clusters tags based on the input product data of the product records.

An attribute master list generator module 102-4 generates an attribute-master list 102-4-1. The attribute master list generator module 102-4 samples a subset of product records from the product catalog. The attribute master list generator module 102-4 detects product category data in each sampled product record. The attribute master list generator module 102-4 clusters each sampled product record with similar product category data. For each record cluster, the attribute master list generator module 102-4 builds an attribute histogram based on a distribution of occurrences of product category attribute data in the record cluster. The attribute master list generator module 102-4 creates attribute-master list 102-4-1 with master-attribute-keys based on a portion of the attribute histogram and a data type of each attribute-key. For example, the top 30% (or any defined percentage threshold) occurring attributes in the attribute histogram may be used as master-attribute keys. The attribute master list generator module 102-4 assigns the attribute-master list 102-4-1 to a particular node in the classification tree 102-3-1.

An attribute key-value aggregator module 102-5 generates an attribute-allowed-value list 102-5-1. For each record cluster, the attribute key-value aggregator module 102-5 builds a key-value histogram based on a distribution of occurrences of product category value data in the record cluster. For each master attribute-key from the attribute master list generator module 102-4, the attribute key-value aggregator module 102-5 creates the attribute-allowed-values list 102-5-1 based on a portion of the key-value histogram. For example, the top 25% (or any defined percentage threshold) occurring values in the key-value histogram may be used as key-values.

An attribute equivalent values generator module 102-6 generates an attribute-equivalent-values list 102-6-1. The attribute equivalent values generator module 102-6 identifies sampled product records with matching product identifiers. The attribute equivalent values generator module 102-6 product builds identifier clusters based on sampled product records with matching product identifiers. For each product identifier cluster, attribute-equivalent-values list 102-6-1 collects key data with value data from the sampled product records in the cluster. The attribute equivalent values generator module 102-6 detects key data matching a particular attribute-key in a respective attribute-allowed-values list. The attribute equivalent values generator module 102-6 defines a most-frequently occurring value data of the matching key data as a representative-key-value. The attribute equivalent values generator module 102-6 generates an attribute-equivalent-values list 102-6-1 for the particular attribute-key that includes: the representative-key-value associated with the remaining plurality of values of the detected, matching key data.

As shown in FIG. 3B, each node (or leaf) in the classification tree 102-3-1 represents a product category. For example, a first node (L1) may represent a "Clothing" product category and a second node (L2) at the next-level down may represent a "Clothing>Men's" product category. A third node (L3) at a subsequent-level down may represent a "Clothing>Men's>Pants" product category. The first, second and third node thereby define a product category path of "Clothing>Men's>Jeans."

As shown in FIG. 3C, the attribute-master list 102-4-1 for the L1 "Clothing" node contains master-attribute keys of "Brand," "Color," and "Material." The L2 "Clothing>Men's" node contains attribute-keys of "Size" and "Age Group." The L3 "Clothing>Men's>Pants" node contains attribute-keys of "Waist Size," "Leg Length," and "Num Pockets." The attribute-allowed-value list 102-5-1 contains respective key-values for the master-attribute keys listed in the attribute-master list 102-4-1. For example, the "Brand" attribute-key has the key-values of "Levi's," "Wrangler," and "Calvin Klein."

The attribute-equivalent-values list 102-6-1 represents how a particular key-value for an attribute-key may be represented differently in the input product records. For example, for the "Color" attribute-key has equivalent key-values of "Black," "BLK," BLACK" and "black." Equivalent key-values may have an assigned representative key-value that will be used by the system 100 for each occurrence of the corresponding equivalent key-values. For example, if "Black" is a representative key-value, then whenever an input product record has product attribute data of "BLK," BLACK" and "black," the system 100 will use the "Black" key-value.

As shown in FIG. 3D, a heuristics generator module 102-7 of the heuristics & model generator module 102-1 receives product records from a product catalog 104-2 and accessed the classification tree 102-3-1, an attribute-master list(s) 102-4-1 and an attribute-allowed-values list 205-1. The heuristics generator module 102-7 generates a key-mapping heuristic(s), a value-dictionary heuristic(s) and a regex key-value heuristic(s).

To generate a key-mapping heuristic, the heuristics generator module 102-7 samples a subset of product records from the product catalog. The heuristics generator module 102-7 collects one or more structured key-value pairs from a sampled product record. The heuristics generator module 102-7 compares each structured key-value pair to one or more attribute-allowed-values lists for master attribute-keys. The heuristics generator module 102-7 identifies a candidate-key from a respective structured key-pair upon determining the structured key satisfies a similarity threshold with an allowed attribute-key in one of the compared attribute-allowed-values lists. The heuristics generator module 102-7 creates the key-mapping heuristic between the candidate key and a particular master attribute-key associated with the compared attribute-allowed-values lists 102-5-1 that includes the similar, allowed attribute-key. The heuristics generator module 102-7 compares each structured key-value pair to one or more attribute-equivalent-values list 102-5-1.

The heuristics generator module 102-7 identifies a candidate-value from a respective structured key-pair upon determining the structured value satisfies a similarity threshold with an equivalent key-value in one of the compared attribute-equivalent-values list. The heuristics generator module 102-7 creates a value-mapping heuristic between the candidate value and a particular representative key-value associated with the compared attribute-equivalent-values list that includes the similar, equivalent key-value.

The generate a value-dictionary heuristic, the heuristics generator module 102-7 samples a subset of product records from the product catalog. The heuristics generator module 102-7 builds a key-value histogram based on a distribution of occurrences of value data for product attribute data in the sample product records. The heuristics generator module 102-7 identifies, in the key-value histogram, key value data for particular product attribute data that minimally occurs for other product attribute data. The heuristics generator module 102-7 compares the particular product attribute data with the attribute-allowed-values list 102-5-1 to identify an allowed attribute-key that satisfies a similarity threshold with the particular product attribute data. The heuristics generator module 102-7 generates a value-dictionary heuristic that defines the identified key value data as an exclusive key-value for the attribute-allowed-values list 102-5-1 that includes the similar allowed attribute-key.

To generate a regex key-value heuristic, the heuristics generator module 102-7 samples a subset of product records from the product catalog. The heuristics generator module 102-7 accesses in the key data one or more related attribute-master lists 102-4-1 and attribute-allowed-values lists 102-5-1. The heuristics generator module 102-7 combines the related lists 102-4-1, 102-5-1. The heuristics generator module 102-7 highlights text in a sampled product record that matches one or more entries in the combined list. The heuristics generator module 102-7 detects a first highlighted text occurs within a threshold distance of a second highlighted text detects a threshold spacing is satisfied between the first and the second highlighted text. The heuristics generator module 102-7 identifies a first entry in the combined list that matches the first highlighted text and identifies a second entry in the combined list that matches the second highlighted text. The heuristics generator module 102-7 a regex key-value heuristic includes the first entry, the second entry and spacing for inserting of select key-values and associates the regex key-value heuristic with related attribute-master list from the combined list.

The active learning training pipeline module 108 uses one or more ML models to make a set of predictions against an input batch from a training dataset 120-2 of product record data. Training of the ML models is modified via two separate techniques to improve accuracy. First, external knowledge is introduced model to provide greater context. The external knowledge 122 includes a representation(s) of the attribute key-value distribution histograms, standard character n-grams, word, casing and positional features. Second, pre-training technique are employed to initialize the ML models using publicly available language modeling weights and embedding datasets. Pre-training is also performed with product category agnostic datasets, and product category specific datasets, and then with representative data from the target dataset that is to be processed.

Figure 3E:
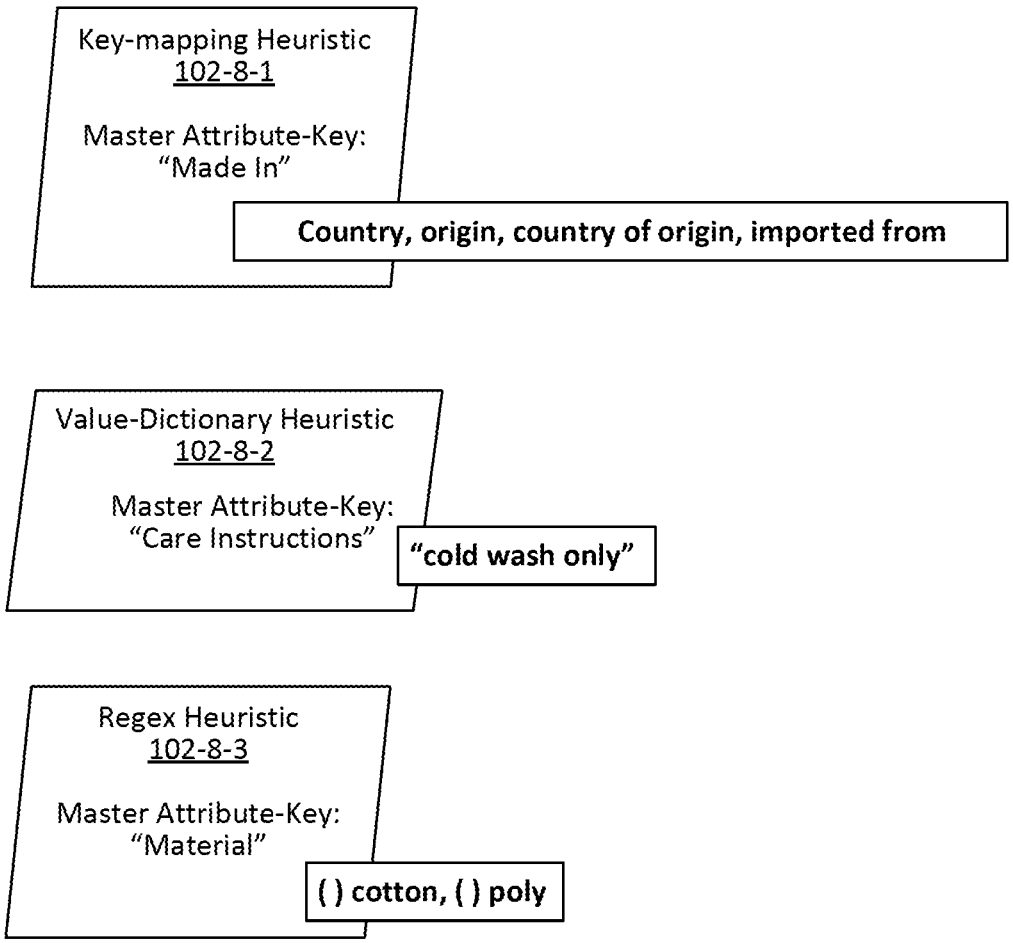
FIG. 3E is an example diagram of heuristics of one or more embodiments.

As shown in FIG. 3E, a key-mapping heuristic 102-8-1 exists for a "Made In" master attribute-key. The key-mapping heuristic 102-8-1 maps product attribute text of: "country," "origin," "country of origin" and "imported from" to the "Made In" master attribute-key. A value-dictionary heuristic 102-8-2 for a "Care Instructions" master attribute-key has an exclusive key-value of "cold wash only," which is attribute value text that always never occurs with respect to other possible master attribute-key. A regex heuristic 102-8-3 has attribute value text of "( ) cotton, ( )poly"—which is a pattern of text and spacing, such as spacing between a parentheses symbol and a text character and spacing between two parentheses symbols in which value-keys typically appear for a "Material" master attribute-key.

Figure 4A:
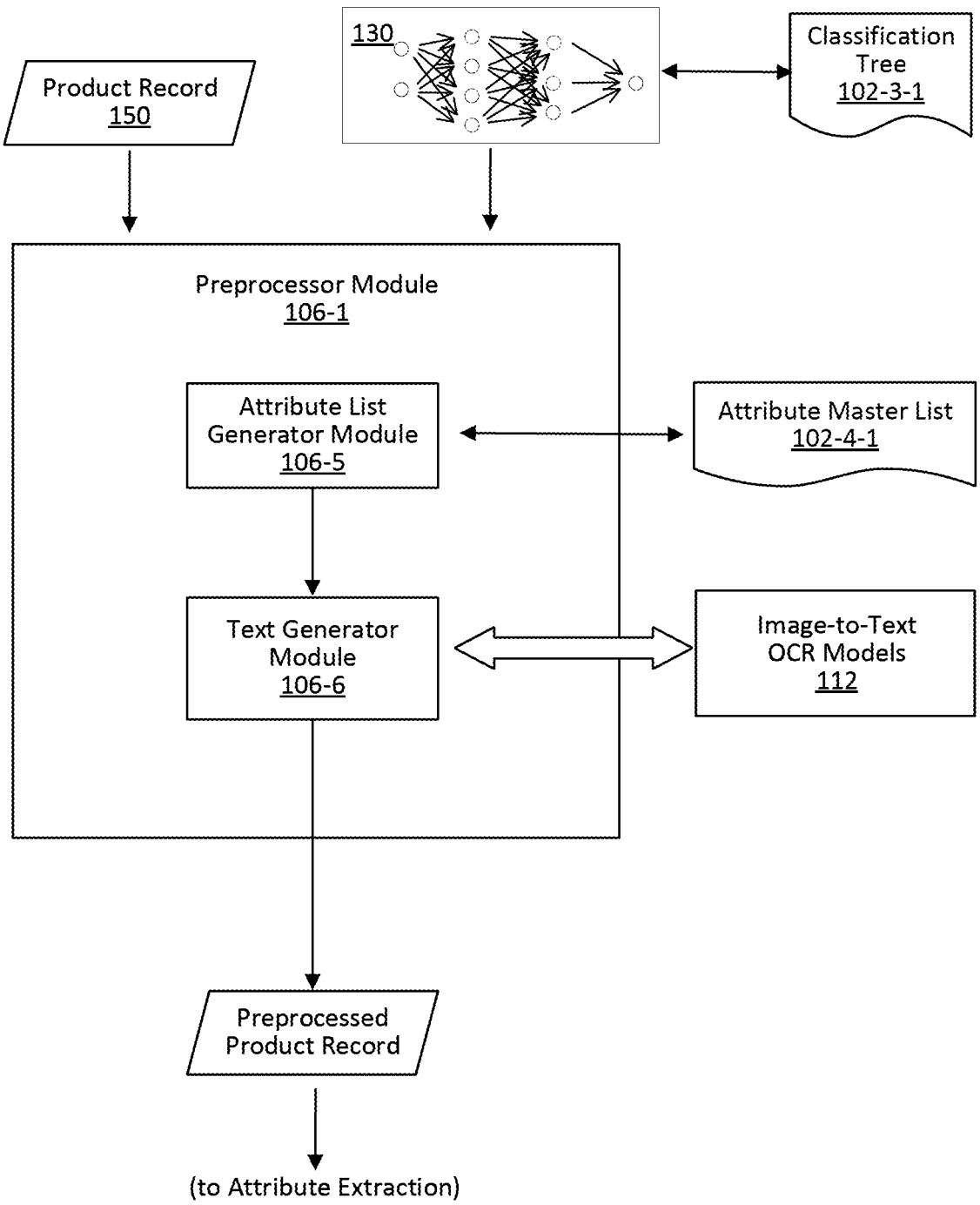
FIGS. 4A-4B is an example diagram of one or more embodiments.

As shown in FIG. 4A, the preprocessor module 106-1 may also have a text generator module 106-6 that is also utilized to generate the preprocessed product record. The text generator module 106-6 extracts all available text from product records such as the product title, description, key highlights, specification tables, reviews, etc. These texts will be merged and forwarded together with the product record for subsequent stages. This text generator also interfaces with optical character recognition (OCR) modules where possible. The purpose of this is to enable extraction of any text that might be present within the images associated with the product record. Standard OCR models are used to extract text from images, along with the X-Y bounding boxes of each image. The X-Y coordinates are also merged as additional embedding features to aid the enrichment process.

Figure 4B:
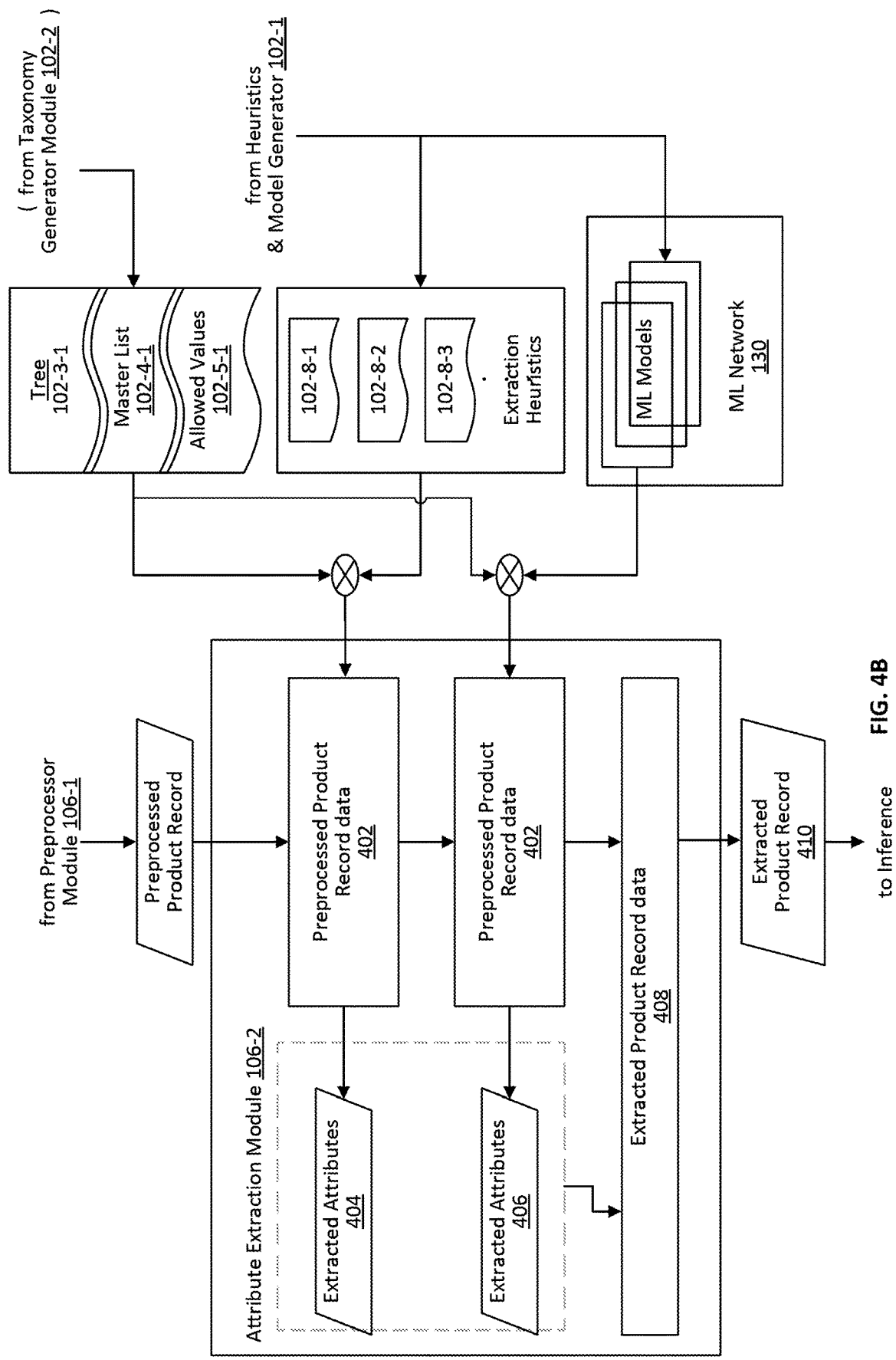

As shown in FIG. 4B, the attribute extraction module 106-2 matches a preprocessed product record against the results from the Taxonomy Generator module 102-2. Relevant Extraction Heuristics 102-8-1, 102-8-2, 102-8-3 are selected and applied on the input product record as well. By matching the record against the results from the Taxonomy Generator, the relevant Machine Learning models are selected and applied on the product. The extracted attributes may then be merged with the product record by inserting the extracted attributes into the product record Also add the source and confidence score associated with each extraction result.

As shown in FIG. 5, in a normalization loop method 500, the system 100 normalizes attribute-keys based on numerical data types against standard scale conversions (Act 502). For attribute-keys based on textual data types, the system 100 fingerprints the corresponding attribute-key to enable a fuzzy comparison against the attribute-equivalent-values list 102-6-1 and the attribute-allowed-values list 102-5-1 (Act 504). If the comparison returns a match, the system 100 generates a normalized attribute-key based on the matched attribute key from either the attribute-equivalent-values list 102-6-1 and the attribute-allowed-values list 102-5-1 (Act 506). If the comparison does not return a match, the unmatched attribute-keys are collected and set aside for human testers to later look for patterns within the unmatched collection. If a particular pattern is detected, the human testers may update the attribute-equivalent-values list 102-6-1 and the attribute-allowed-values list 102-5-1 to ensure the currently missed pattern in detected (Act 508). The system 100 merges the normalized attribute with merged product record to generate an output normalized product record (Act 510).

Figure 7:
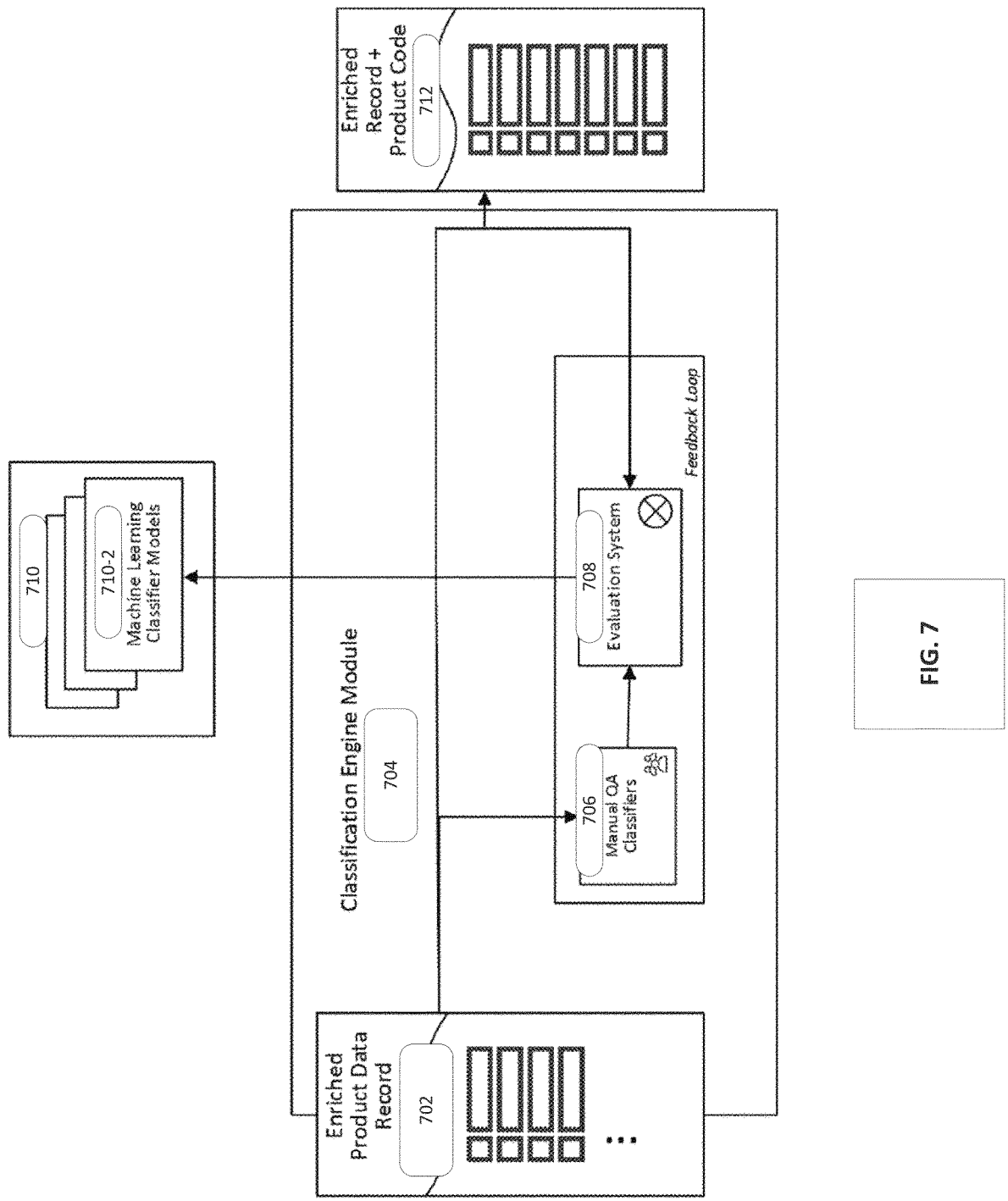
FIG. 7 illustrates an example architecture.

An example classification architecture will now be described with reference to FIG. 7. As described herein, the illustrated architecture is configured to generate classification information, such as a product code that is from or based on a classification taxonomy. The product code may be used to augment data in a record, such as a product record. As shown in FIG. 7, a classification engine module 704 takes a product record 702 (e.g., an enriched product data record) as input. A role of the classification engine module 704 is to augment the enriched product data record 702 with specific classification information that may be required for a compliant transaction. The classification information may be a product code that is on a classification taxonomy, including those such as the Harmonized System (HS) code, Harmonized Tariff System (HTS) code, Export Control Classification Number (ECCN) code, Schedule B code, or United Nations Standard Products and Services Code (UNSPSC). Each of these example classification taxonomies are developed and maintained by various governments and international agencies as per their regulatory requirements.

Each of these example classification taxonomies are dependent on various pieces of product information, such as material, composition, form, utility, function, as well as a number of other parameters (which may be determined from text on a parsed product document, such as a webpage and/or on a product image). These parameters may be in the enriched product data record 702, which is sent to an ensemble 710-2 of ML classifier models which deploy a number of artificial intelligence techniques and algorithms. These include traditional machine learning techniques such as logistic regression, random forests, gradient boosting, as well as modern deep learning techniques, such as convolutional neural networks (CNNs), bi-directional long-short term memory (LSTM) networks and transformer networks. An ensemble model consisting of various individual techniques can also be used to achieve better performance and trade-offs against precision and recall of assigned codes. The ensemble returns a predicted product code and the enriched product data record 712.

In addition, the classification engine module 704 may include feedback loop. Selectively sampled input product data records, received by the classification engine module 704, are forwarded for human manual QA classification while also being sent to the ML ensemble 710-2. A human QA classifier thereby provides an independent result by attempting to predict the product code based on a given sampled product data records. This allows for a fair evaluation system to be put in place. By comparing the results of the human classifier and the ML ensemble 710-2, any detected errors by the ML ensemble 710-2 can be quantified and used to iteratively improve ML ensemble 710-2 performance through methods such as reinforcement learning. The whole feedback loop ensures that the ML ensemble 710-2 can be kept relevant over time and responsive to variations in classification performance.

An aspect relates to a computer-implemented method, the method comprising: optionally crawling a website to identify one or more product pages, the one or more product pages comprising data about a respective product; optionally, parsing and extracting product attributes from at least a first product page; creating a first product data set using the extracted product attributes; providing the first product data set to a machine learning model; using the machine learning model to predict, based at least in part on a destination associated with the first product: a first attribute based on one or more classification code taxonomies; and using the first attribute, predicted based on one or more classification code taxonomies, with respect to cross-border shipping of the first product.

Optionally, the extracted product attributes include one or more images. Optionally extracting product attributes from at least the first product page comprises extracting product attributes from at least text of the first product page, and wherein optionally the extracted product attributes include a product material, a product composition, a product form, a product utility, and/or function. Optionally, the method further comprises: selecting historical shipping information; augmenting the first product data set with the selected historical shipping information prior to using the learning engine to predict, based at least in part on a destination associated with the first product, the first attribute predicted based on one or more classification code taxonomies; and populating the first product data set with the predicted first attribute to enable a compliant cross-border shipment; wherein the machine learning model comprises an ensemble of machine learning models including one or more convolutional neural networks (CNNs), bi-directional long-short term memory (LSTM) networks and/or transformer networks; and wherein the machine learning model is configured to predict the first attribute based on one or more commerce classification code taxonomies, comprising a Harmonized Tariff System (HTS) code. Optionally, the method further comprises: selecting historical shipping information; augmenting the first product data set with the selected historical shipping information prior to using the learning engine to predict, based at least in part on a destination associated with the first product, the first attribute. Optionally, the machine learning model is configured to predict the first attribute using a tariff code. Optionally, the machine learning model comprises one or more convolutional neural networks (CNNs), bi-directional long-short term memory (LSTM) networks and/or transformer networks. Optionally, the one or more classification code taxonomies utilize Harmonized System (HS) code, Harmonized Tariff System (HTS) code, Export Control Classification Number (ECCN) code, Schedule B code, and/or United Nations Standard Products and Services Code (UNSPSC). Optionally, the method further comprises: identifying and disambiguating global identifiers in the first product data set; and associating the global identifiers with a corresponding formatting convention.

Other aspects that may be utilized with and form part of the systems and methods described herein are described in U.S. patent application Ser. No. 16/740,301, filed Jan. 10, 2020, and titled "ARTIFICIAL INTELLIGENCE FOR COMPLIANCE SIMPLIFICATION IN CROSS-BORDER LOGISTICS," and in U.S. patent application Ser. No. 17/492,138, filed Oct. 1, 2021, and titled "ARTIFICIAL INTELLIGENCE FOR PRODUCT DATA EXTRACTION," the contents of which are incorporated herein by reference in their entirety.

Embodiments may be used on a wide variety of computing devices in accordance with the definition of computer and computer system as described herein. Mobile devices such as cellular phones, smart phones, PDAs, and tablets may implement the functionality described in this patent.

Figure 6:
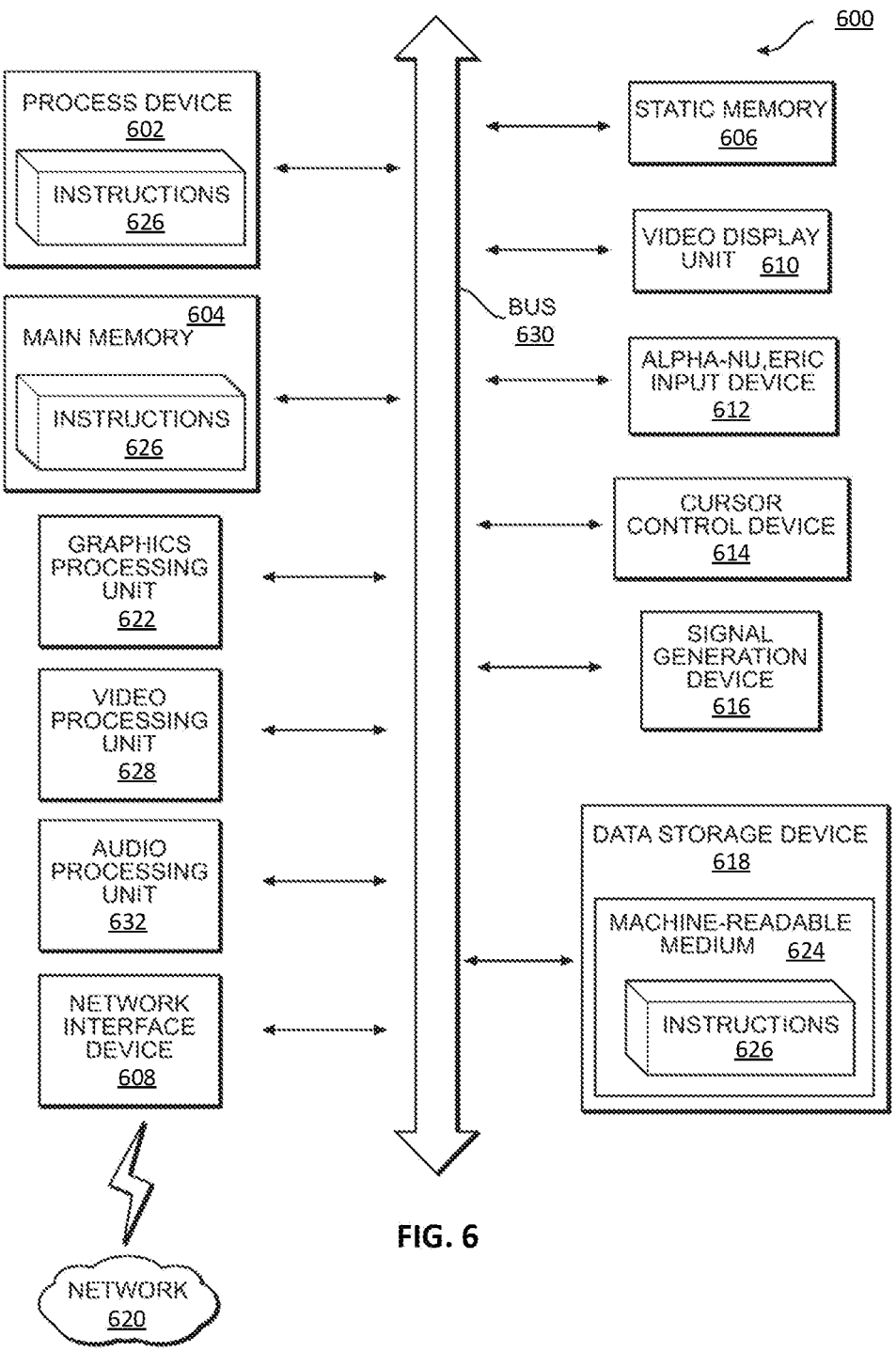
FIG. 6 is an example diagram of one environment in which some embodiments may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) or an input touch device, a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   defining a product-description taxonomy represented according to a classification tree by clustering tags using product data from product records in a product catalog,
   the classification tree comprising at least one product category path defined by one or more product category nodes at successively deeper tree levels,
   wherein a given product category node is associated with at least one product attribute-key paired with one or more key-values;
   defining key data using the product data, the key data comprising:
   at least one product attribute-key,
   one or more allowed key-values, and
   a representative key-value associated with a set of equivalent key-values; and
   applying:
   one or more machine learning (ML) models, and
   the key data, and/or heuristic data, the heuristic data defined using the product data and the key data, the heuristic data comprising: a mapping between a product attribute-key and a set of one or more equivalent attribute-keys and at least one key-value exclusive to a particular product attribute-key,
   to an input product record to generate an output normalized product record categorizing the input product record according to the classification tree's product-description taxonomy.

2. The computer-implemented method of claim 1, the method further comprising:
   accessing a first product page, the first product page comprising data about a respective product;
   extracting product attributes from the first product page;
   creating a first product data record using the extracted product attributes, wherein the first product record is missing a first attribute that corresponds to a code from a first taxonomy;
   providing the first product data record to one or more machine learning models;
   using the one or more machine learning models to predict, based at least in part on a destination associated with the first product, the first attribute that corresponds to a code from a first taxonomy; and
   using the first predicted attribute with respect to cross-border shipping of the first product.

3. The computer-implemented method of claim 1, wherein defining at least one product attribute-key comprises:
   sampling a subset of product records from the product catalog;
   detecting product category data in for at least one sampled product record;
   clustering the sample product record with similar product category data;
   for at least one record cluster:
   building an attribute histogram using a distribution of occurrences of product category attribute data in the record cluster;
   creating an attribute-product set comprising product-attribute-keys using a portion of the attribute histogram and a data type of for at least one attribute-key; and
   assigning the attribute-product set to a particular node in the classification tree.

4. The computer-implemented method of claim 2, wherein defining one or more allowed key-values for the node comprises:
   for at least one record cluster:
   building a key-value histogram using a distribution of occurrences of product category value data in the record cluster;
   for at least one product attribute-key, creating an attribute-allowed-values set using a portion of the key-value histogram.

5. The computer-implemented method of claim 1, wherein defining a representative key-value matched to a set of equivalent key-values comprises:
   identifying sampled product records with matching product identifiers;
   building product identifier clusters using sampled product records with matching product identifiers;
   for at least one product identifier cluster:
   collecting key data with value data from the sampled product records in the cluster;
   detecting key data matching a particular attribute-key in a respective attribute-allowed-values set;
   defining a most-frequently occurring value data of the matching key data as a representative-key-value; and
   generating an attribute-equivalent-values set for the particular attribute-key comprising:
   the representative-key-value associated with a remaining plurality of values of the detected, and
   matching key data.

6. The computer-implemented method of claim 1, wherein defining a mapping in the heuristic data comprises:
   sampling a subset of product records from the product catalog;

collecting one or more structured key-value pairs from a sampled product record;

comparing for at least one structured key-value pair to one or more attribute-allowed-values sets for product attribute-keys;

identifying a candidate-key from a respective structured key-pair upon determining the structured key satisfies a similarity threshold with an allowed attribute-key in one of the compared attribute-allowed-values sets;

creating a key-mapping heuristic between the candidate key and a particular product attribute-key associated with the compared attribute-allowed-values sets that includes the similar, allowed attribute-key;

comparing for at least one structured key-value pair to one or more attribute-equivalent-values set;

identifying a candidate-value from a respective structured key-pair upon determining the structured value satisfies a similarity threshold with an equivalent key-value in one of the compared attribute-equivalent-values set; and creating a value-mapping heuristic between the candidate value and a particular representative key-value associated with the compared attribute-equivalent-values set that includes the similar, equivalent key-value.

7. The computer-implemented method of claim 1, wherein defining a plurality of key-values exclusive to a particular product attribute-key in the heuristic data comprises:

sampling a subset of product records from the product catalog;

building a key-value histogram using a distribution of occurrences of value data for product attribute data in the sample product records;

identifying, in the key-value histogram, key value data for particular product attribute data that minimally occurs for other product attribute data;

comparing the particular product attribute data with the attribute-allowed-values set to identify an allowed attribute-key that satisfies a similarity threshold with the particular product attribute data; and generating a value-dictionary heuristic that defines the identified key value data as an exclusive key-value for the attribute-allowed-values set that includes the similar allowed attribute-key.

8. The computer-implemented method of claim 1, the method further comprising defining a frequent text phrase as a regex key-value that corresponds to a product attribute-key in the heuristic data by at least:

sampling a subset of product records from the product catalog;

accessing in the key data one or more related attribute-product sets and attribute-allowed-values sets;

combining the related sets;

indicating text in a sampled product record that matches one or more entries in the combined set;

detecting a first indicated text occurs within a threshold distance of a second indicated text;

detecting a threshold spacing is satisfied between the first and the second indicated text;

identifying a first entry in the combined set that matches the first indicated text;

identifying a second entry in the combined set that matches the second indicated text;

generating a regex key-value heuristic includes the first entry, the second entry and spacing for inserting of select key-values; and associating the regex key-value heuristic with related attribute-product set from the combined set.

9. The method of claim 1, wherein generating an output normalized product record for an input product record comprises:

feeding the input product record into one or more machine learning (ML) models to predict a product category for the input product record from the classification tree's product-description taxonomy;

identifying, for the predicted product category, a product category path of one or more nodes in the classification tree;

accessing, in the key data, a product attribute-list for at least one elder node in the product category path at a higher-tree level above the node for the predicted product category and access the attribute-allowed-values sets that correspond to the product attribute-lists of for at least one elder node;

generating a set of record attribute-keys to be considered for the input product record using the accessed attribute-product sets and corresponding attribute-allowed-values sets of the elder nodes;

extracting text from the input product record; and generating a pre-processed product record comprising the input product record, the predicted product category, the set of record attribute-keys and the extracted text.

10. The method of claim 1, further comprising:

feeding the input product record into one or more machine learning (ML) models to predict a product category for the input product record from the classification tree's product-description taxonomy;

identifying, for the predicted product category, a product category path of one or more nodes in the classification tree;

accessing, in the key data, a product attribute-list for at least one elder node in the product category path at a higher-tree level above the node for the predicted product category and access the attribute-allowed-values sets that correspond to the product attribute-lists of for at least one elder node;

generating a set of record attribute-keys to be considered for the input product record using the accessed attribute-product sets and corresponding attribute-allowed-values sets of the elder nodes;

extracting text from the input product record;

generating a pre-processed product record comprising the input product record, the predicted product category, the set of record attribute-keys and the extracted text;

identifying one or more attribute-keys in the set of record attribute-keys that map to a portion of the extracted text via one or more key-mapping heuristics;

feeding the pre-processed product record into one or more extraction ML models;

identifying ML output and one or more mapped attribute-keys as extracted attribute-keys; and creating an extracted product record by inserting the extracted attribute-keys into the pre-processed product record.

11. The method of claim 1, further comprising:

feeding the input product record into one or more machine learning (ML) models to predict a product category for the input product record from the classification tree's product-description taxonomy;

identifying, for the predicted product category, a product category path of one or more nodes in the classification tree;

accessing, in the key data, a product attribute-list for at least one elder node in the product category path at a higher-tree level above the node for the predicted product category and access the attribute-allowed-values sets that correspond to the product attribute-lists of for at least one elder node;

generating a set of record attribute-keys to be considered for the input product record using the accessed attribute-product sets and corresponding attribute-allowed-values sets of the elder nodes;

extracting text from the input product record;

generating a pre-processed product record comprising the input product record, the predicted product category, the set of record attribute-keys and the extracted text;

identifying one or more attribute-keys in the set of record attribute-keys that map to a portion of the extracted text via one or more key-mapping heuristics;

feeding the pre-processed product record into one or more extraction ML models;

identifying ML output and one or more mapped attribute-keys as extracted attribute-keys;

creating an extracted product record by inserting the extracted attribute-keys into the pre-processed product record;

identifying one or more inferred attribute-keys as output from feeding the extracted product record into one or more ML models; and creating an extracted product record by inserting inferred attribute-keys into the extracted product record.

12. The method of claim 1, further comprising:

feeding the input product record into one or more machine learning (ML) models to predict a product category for the input product record from the classification tree's product-description taxonomy;

identifying, for the predicted product category, a product category path of one or more nodes in the classification tree;

accessing, in the key data, a product attribute-list for at least one elder node in the product category path at a higher-tree level above the node for the predicted product category and access the attribute-allowed-values sets that correspond to the product attribute-lists of for at least one elder node;

generating a set of record attribute-keys to be considered for the input product record using the accessed attribute-product sets and corresponding attribute-allowed-values sets of the elder nodes;

extracting text from the input product record;

generating a pre-processed product record comprising the input product record, the predicted product category, the set of record attribute-keys and the extracted text;

identifying one or more attribute-keys in the set of record attribute-keys that map to a portion of the extracted text via one or more key-mapping heuristics;

feeding the pre-processed product record into one or more extraction ML models;

identifying ML output and one or more mapped attribute-keys as extracted attribute-keys;

creating an extracted product record by inserting the extracted attribute-keys into the pre-processed product record;

compare the extracted product record to one or more attribute-product sets to determine a value data type for at least one inferred attribute-key;

for a given inferred attribute-key with a numeric data type, access a scale conversion library to identify a scaled unit conversion for the numeric attribute; and for a given inferred attribute-key with a textual data type, normalize the extracted attribute-key.

13. The computer-implemented method of claim 1, wherein at least one product record comprises data extracted from an image.

14. A system comprising:
one or more processors; and
a non-transitory computer readable medium storing a plurality of instructions, which when executed, cause the one or more processors to:
defining a product-description taxonomy represented according to a classification tree comprising clustering tags using product data from product records in a product catalog, the classification tree comprising at least one product category path defined by one or more product category nodes at successively deeper tree levels, at least one product category node associated with at least one product attribute-key paired with one or more key-values;
defining key data using the product data, the key data comprising:
at least one product attribute-key,
one or more allowed key-values, and
a representative key-value corresponding to a set of equivalent key-values;
defining heuristic data using the product data and the key data, the heuristic data comprising:
a mapping between a product attribute-key and a set of equivalent attribute-keys, and
at least one key-value exclusive to a particular product attribute-key; and
applying:
one or more machine learning (ML) models, and
the key data, and/or heuristic data, the heuristic data defined using the product data and the key data, the heuristic data comprising a mapping between a product attribute-key and a set of equivalent attribute-keys,
to an input product record to generate an output normalized product record categorizing the input product record according to the classification tree's product-description taxonomy.

15. The system of claim 14, the system further configured to:
access a first product page, the first product page comprising data about a respective product;
extract product attributes from the first product page;
define a first product data record using the extracted product attributes, wherein the first product record is missing a first attribute that corresponds to a code from a first taxonomy;
use one or more machine learning models to predict, based at least in part on a destination associated with the first product, the first attribute that corresponds to a code from a first taxonomy; and
use the first predicted attribute with respect to cross-border shipping of the first product.

16. The system of claim 14, wherein at least one product record comprises data extracted from an image.

17. The system of claim 14, wherein defining at least one product attribute-key comprises:
sampling a subset of product records from the product catalog;
detecting product category data in at least one sampled product record;
clustering the sample product record with similar product category data;

for at least one record cluster:
  building an attribute histogram using a distribution of occurrences of product category attribute data in the record cluster;
  creating an attribute-product set comprising product-attribute-keys using a portion of the attribute histogram and a data type of for at least one attribute-key; and
  assigning the attribute-product set to a particular node in the classification tree.

18. The system of claim 14, wherein defining a plurality of allowed key-values for the node comprises:
for at least one record cluster:
  building a key-value histogram using a distribution of occurrences of product category value data in the record cluster;
  for at least one product attribute-key, creating an attribute-allowed-values set using a portion of the key-value histogram.

19. The system of claim 14, wherein defining a representative key-value matched to a set of equivalent key-values comprises:
  identifying sampled product records with matching product identifiers;
  building product identifier clusters using sampled product records with matching product identifiers;
  for at least one product identifier cluster:
  collecting key data with value data from the sampled product records in the cluster;
    detecting key data matching a particular attribute-key in a respective attribute-allowed-values set;
  defining a most-frequently occurring value data of the matching key data as a representative-key-value; and
  generating an attribute-equivalent-values set for the particular attribute-key comprising:
    the representative-key-value associated with a remaining plurality of values of the detected, and matching key data.

20. The system of claim 14, wherein defining a mapping in the heuristic data comprises:
  sampling a subset of product records from the product catalog;
  collecting one or more structured key-value pairs from a sampled product record;
  comparing for at least one structured key-value pair to one or more attribute-allowed-values sets for product attribute-keys;
  identifying a candidate-key from a respective structured key-pair upon determining the structured key satisfies a similarity threshold with an allowed attribute-key in one of the compared attribute-allowed-values sets;
  creating a key-mapping heuristic between the candidate key and a particular product attribute-key associated with the compared attribute-allowed-values sets that includes the similar, allowed attribute-key;
  comparing for at least one structured key-value pair to one or more attribute-equivalent-values set;
  identifying a candidate-value from a respective structured key-pair upon determining the structured value satisfies a similarity threshold with an equivalent key-value in one of the compared attribute-equivalent-values set; and
  creating a value-mapping heuristic between the candidate value and a particular representative key-value associated with the compared attribute-equivalent-values set that includes the similar, equivalent key-value.

21. The system of claim 14, wherein defining a plurality of key-values exclusive to a particular product attribute-key in the heuristic data comprises:
  sampling a subset of product records from the product catalog;
  building a key-value histogram using a distribution of occurrences of value data for product attribute data in the sample product records;
  identifying, in the key-value histogram, key value data for particular product attribute data that minimally occurs for other product attribute data;
  comparing the particular product attribute data with the attribute-allowed-values set to identify an allowed attribute-key that satisfies a similarity threshold with the particular product attribute data; and
  generating a value-dictionary heuristic that defines the identified key value data as an exclusive key-value for the attribute-allowed-values set that includes the similar allowed attribute-key.

22. The system of claim 14, wherein the system is configured to define a frequent text phrase as a regex key-value that corresponds to a product attribute-key in the heuristic data by at least:
  sampling a subset of product records from the product catalog;
  accessing in the key data one or more related attribute-product sets and attribute-allowed-values sets;
  combining the related sets;
  indicating text in a sampled product record that matches one or more entries in the combined set;
  detecting a first indicated text occurs within a threshold distance of a second indicated text;
  detecting a threshold spacing is satisfied between the first and the second indicated text;
  identifying a first entry in the combined set that matches the first indicated text;
  identifying a second entry in the combined set that matches the second indicated text;
  generating a regex key-value heuristic includes the first entry, the second entry and spacing for inserting of select key-values; and
  associating the regex key-value heuristic with related attribute-product set from the combined set.

23. The system of claim 14, wherein generating an output normalized product record for an input product record comprises:
  feeding the input product record into one or more machine learning (ML) models to predict a product category for the input product record from the classification tree's product-description taxonomy;
  identifying, for the predicted product category, a product category path of one or more nodes in the classification tree;
  accessing, in the key data, a product attribute-list for at least one elder node in the product category path at a higher-tree level above the node for the predicted product category and access the attribute-allowed-values sets that correspond to the product attribute-lists of for at least one elder node;
  generating a set of record attribute-keys to be considered for the input product record using the accessed attribute-product sets and corresponding attribute-allowed-values sets of the elder nodes;
  extracting text from the input product record; and
  generating a pre-processed product record comprising the input product record, the predicted product category, set of record attribute-keys and the extracted text.

24. The system of claim 14, wherein generating an output normalized product record for an input product record comprises:
feeding the input product record into one or more machine learning (ML) models to predict a product category for the input product record from the classification tree's product-description taxonomy;
identifying, for the predicted product category, a product category path of one or more nodes in the classification tree;
accessing, in the key data, a product attribute-list for at least one elder node in the product category path at a higher-tree level above the node for the predicted product category and access the attribute-allowed-values sets that correspond to the product attribute-lists of for at least one elder node;
generating a set of record attribute-keys to be considered for the input product record using the accessed attribute-product sets and corresponding attribute-allowed-values sets of the elder nodes;
extracting text from the input product record; and
generating a pre-processed product record comprising the input product record, the predicted product category, set of record attribute-keys and the extracted text;
wherein the system is further configured to:
identify one or more attribute-keys in the set of record attribute-keys that map to a portion of the extracted text via one or more key-mapping heuristics;
feed the pre-processed product record into one or more extraction ML models;
identify ML output and one or more mapped attribute-keys as extracted attribute-keys; and
create an extracted product record by inserting the extracted attribute-keys into the pre-processed product record.

25. The system of claim 14, wherein generating an output normalized product record for an input product record comprises:
feeding the input product record into one or more machine learning (ML) models to predict a product category for the input product record from the classification tree's product-description taxonomy;
identifying, for the predicted product category, a product category path of one or more nodes in the classification tree;
accessing, in the key data, a product attribute-list for at least one elder node in the product category path at a higher-tree level above the node for the predicted product category and access the attribute-allowed-values sets that correspond to the product attribute-lists of for at least one elder node;
generating a set of record attribute-keys to be considered for the input product record using the accessed attribute-product sets and corresponding attribute-allowed-values sets of the elder nodes;
extracting text from the input product record; and
generating a pre-processed product record comprising the input product record, the predicted product category, set of record attribute-keys and the extracted text;
wherein the system is further configured to:
identify one or more attribute-keys in the set of record attribute-keys that map to a portion of the extracted text via one or more key-mapping heuristics;
feed the pre-processed product record into one or more extraction ML models;
identify ML output and one or more mapped attribute-keys as extracted attribute-keys;
create an extracted product record by inserting the extracted attribute-keys into the pre-processed product record;
identify one or more attribute-keys in the set of record attribute-keys that map to a portion of the extracted text via one or more key-mapping heuristics;
feed the pre-processed product record into one or more extraction ML models;
identify ML output and one or more mapped attribute-keys as extracted attribute-keys;
create an extracted product record by inserting the extracted attribute-keys into the pre-processed product record;
identify one or more inferred attribute-keys as output from feeding the extracted product record into one or more ML models; and
create an extracted product record by inserting inferred attribute-keys into the extracted product record.

26. The system of claim 14, wherein generating an output normalized product record for an input product record comprises:
feeding the input product record into one or more machine learning (ML) models to predict a product category for the input product record from the classification tree's product-description taxonomy;
identifying, for the predicted product category, a product category path of one or more nodes in the classification tree;
accessing, in the key data, a product attribute-list for at least one elder node in the product category path at a higher-tree level above the node for the predicted product category and access the attribute-allowed-values sets that correspond to the product attribute-lists of for at least one elder node;
generating a set of record attribute-keys to be considered for the input product record using the accessed attribute-product sets and corresponding attribute-allowed-values sets of the elder nodes;
extracting text from the input product record; and
generating a pre-processed product record comprising the input product record, the predicted product category, set of record attribute-keys and the extracted text;
wherein the system is further configured to:
identify one or more attribute-keys in the set of record attribute-keys that map to a portion of the extracted text via one or more key-mapping heuristics;
feed the pre-processed product record into one or more extraction ML models;
identify ML output and one or more mapped attribute-keys as extracted attribute-keys;
create an extracted product record by inserting the extracted attribute-keys into the pre-processed product record;
identify one or more attribute-keys in the set of record attribute-keys that map to a portion of the extracted text via one or more key-mapping heuristics;
feed the pre-processed product record into one or more extraction ML models;
identify ML output and one or more mapped attribute-keys as extracted attribute-keys;
create an extracted product record by inserting the extracted attribute-keys into the pre-processed product record;
identify one or more inferred attribute-keys as output from feeding the extracted product record into one or more ML models;

create an extracted product record by inserting inferred attribute-keys into the extracted product record;
compare the extracted product record to one or more attribute-product sets to determine a value data type for at least one inferred attribute-key;
for given inferred attribute-key with a numeric data type, access a scale conversion library to identify a scaled unit conversion for the numeric attribute; and
for a given inferred attribute-key with a textual data type, normalize the inferred attribute-key.

\* \* \* \* \*